(12) United States Patent
Yurochkin et al.

(10) Patent No.: US 12,287,848 B2
(45) Date of Patent: Apr. 29, 2025

(54) LEARNING MAHALANOBIS DISTANCE METRICS FROM DATA

(71) Applicants: International Business Machines Corporation, Armonk, NY (US); REGENTS OF THE UNIVERSITY OF MICHIGAN, Ann Arbor, MI (US)

(72) Inventors: Mikhail Yurochkin, Cambridge, MA (US); Debarghya Mukherjee, Kolkata (IN); Moulinath Banerjee, Portage, MI (US); Yuekai Sun, Ann Arbor, MI (US); Sohini Upadhyay, Cambridge, MA (US)

(73) Assignees: International Business Machines Corporation, Armonk, NY (US); Regents of the University of Michigan, Ann Arbor, MI (US)

( * ) Notice: Subject to any disclaimer, the term of this patent is extended or adjusted under 35 U.S.C. 154(b) by 993 days.

(21) Appl. No.: 17/345,730

(22) Filed: Jun. 11, 2021

(65) Prior Publication Data

US 2022/0405529 A1    Dec. 22, 2022

(51) Int. Cl.
*G06F 18/22* (2023.01)
*G06F 18/20* (2023.01)
*G06F 18/214* (2023.01)
*G06F 18/40* (2023.01)
*G06N 3/08* (2023.01)

(52) U.S. Cl.
CPC ............ *G06F 18/22* (2023.01); *G06F 18/214* (2023.01); *G06F 18/285* (2023.01); *G06F 18/40* (2023.01); *G06N 3/08* (2013.01)

(58) Field of Classification Search
CPC ...................................................... G06F 18/22
USPC .......................................................... 706/15
See application file for complete search history.

(56) References Cited

U.S. PATENT DOCUMENTS

| | | | |
|---|---|---|---|
| 6,795,793 B2 | 9/2004 | Shayegan et al. |
| 8,682,065 B2 | 3/2014 | Wang et al. |
| 8,873,843 B2 | 10/2014 | Zhu et al. |
| 9,031,331 B2 | 5/2015 | Mensink et al. |
| 9,519,868 B2 | 12/2016 | Criminisi et al. |

(Continued)

FOREIGN PATENT DOCUMENTS

| | | |
|---|---|---|
| WO | WO2017136060 A1 | 8/2017 |
| WO | WO2020121084 A1 | 6/2020 |

OTHER PUBLICATIONS

Xiang, S.; Nie, F.; Zhang, C. Learning a Mahalanobis distance metric for data clustering and classification. Pattern Recognit. 2008, 41, 3600-3612 (Year: 2008).*

(Continued)

*Primary Examiner* — Reza Nabi
(74) *Attorney, Agent, or Firm* — Daniel J. Blabolil

(57) ABSTRACT

The present invention provides techniques for learning Mahalanobis distance similarity metrics from data for individually fair machine learning models. In one aspect, a method for learning a fair Mahalanobis distance similarity metric includes: obtaining data with similarity annotations; selecting, based on the data obtained, a model for learning a Mahalanobis covariance matrix $\Sigma$; and learning the Mahalanobis covariance matrix $\Sigma$ from the data using the model selected, wherein the Mahalanobis covariance matrix $\Sigma$ fully defines the fair Mahalanobis distance similarity metric.

20 Claims, 8 Drawing Sheets

(56) References Cited

U.S. PATENT DOCUMENTS

| | | | |
|---|---|---|---|
| 9,557,957 | B2 | 1/2017 | Guan et al. |
| 10,282,414 | B2 | 5/2019 | Latapie et al. |
| 10,679,100 | B2 | 6/2020 | Kang et al. |
| 11,443,236 | B2* | 9/2022 | Natesan Ramamurthy ................. G06N 20/00 |
| 11,481,810 | B2* | 10/2022 | Liu ................... G06Q 30/0204 |
| 11,501,191 | B2* | 11/2022 | Shaikh .................. G06F 16/211 |
| 11,501,201 | B2* | 11/2022 | Driscoll ................ G06N 20/00 |
| 2006/0230018 | A1 | 10/2006 | Grichnik et al. |
| 2011/0004578 | A1 | 1/2011 | Momma et al. |
| 2012/0143797 | A1 | 6/2012 | Wang et al. |
| 2016/0155068 | A1 | 6/2016 | Hachiya |
| 2016/0239000 | A1 | 8/2016 | Yan et al. |
| 2017/0228641 | A1 | 8/2017 | Sohn |
| 2018/0232663 | A1* | 8/2018 | Ross ...................... G06N 3/045 |
| 2019/0295000 | A1* | 9/2019 | Candel ..................... G06N 5/01 |
| 2020/0074347 | A1* | 3/2020 | Sankaran ............... G06N 3/044 |
| 2020/0082299 | A1 | 3/2020 | Vasconcelos et al. |
| 2020/0311603 | A1* | 10/2020 | Qiu ..................... G06F 11/3452 |
| 2021/0049456 | A1* | 2/2021 | Kursun .................. G06N 3/047 |
| 2021/0241183 | A1* | 8/2021 | Garg ...................... G06N 20/00 |
| 2021/0344745 | A1* | 11/2021 | Mermoud ............... H04L 41/16 |
| 2022/0012542 | A1* | 1/2022 | Cruz ...................... G06N 20/00 |
| 2022/0318685 | A1* | 10/2022 | Sivakumar ............. G06N 20/00 |
| 2022/0405529 | A1* | 12/2022 | Yurochkin ............ G06F 18/214 |

OTHER PUBLICATIONS

Mukherjee, D.; Yurochkin, M.; Banerjee, M.; Sun, Y. Two simple ways to learn individual fairness metrics from data. In Proceedings of the International Conference on Machine Learning, PMLR, Copenhagen, Denmark, Dec. 16-19, 2020; pp. 7097-7107. (Year: 2020).*

Screenshot of yuotube video "Mahalanobis distance with complete example and Python implementation" by the Academician, available online at [https://www.youtube.com/watch?v=4buOoXp7Ayl&t=18s], published on Apr. 20, 2020. (Year: 2020).*

Debarghya Mukherjee, Mikhail Yurochkin, Moulinath Banerjee, Yuekai Sun, "Two Simple Ways to Learn Individual Fairness Metrics from Data," Proceedings of the 37th International Conference on Machine Learning, Vienna, Austria, PMLR 108, 2020, publicly available Jun. 19, 2020 (23 pages)—Grace Period Disclosure.

Sandamurthy K et al., "Improving Quality of Fruits Picked in Orchards Using Mahalanobis Distance Based Model," Emerging Technologies in Data Mining and Information Security. IEMIS 2018 (Sep. 2018) (Abstract, 1 page).

Mell et al., "The NIST Definition of Cloud Computing," NIST Special Publication 800-145, Sep. 2011 (7 pages).

Amanda Bower et al., "Debiasing representations by removing unwanted variation due to protected attributes," arXiv:1807.00461v1 (Jul. 2018) (5 pages).

Andrea Frome et al., "Learning Globally-Consistent Distance Functions for Shape-Based Image Retrieval and Classification," 2007 IEEE 11th International Conference on Computer Vision, Oct. 2007 (8 pages).

Jamieson et al., "Low-Dimensional Embedding using Adaptively Selected Ordinal Data," 2011 49th Annual Allerton Conference on Communication, Control, and Computing (Allerton), Sep. 2011 (8 pages).

Wilber et al., "Cost-Effective HITs for Relative Similarity Comparisons," arXiv:1404.3291v1 (Apr. 2014) (7 pages).

Christina Ilvento, "Metric Learning for Individual Fairness," arXiv:1906.00250v2 (Apr. 2020) (50 pages).

Hanchen Wang et al., "An Empirical Study on Learning Fairness Metrics for COMPAS Data with Human Supervision," arXiv:1910.10255v2 (Oct. 2019) (7 pages).

Gaurush Hiranandani et al., "Fair Performance Metric Elicitation," arXiv:2006.12732v3 (Nov. 2020) (31 pages).

Bolukbasi, et al., "Man is to Computer Programmer as Woman is to Homemaker? Debiasing Word Embeddings," arXiv:1607.06520v1 (Jul. 2016) (25 pages).

Bellet et al., "A Survey on Metric Learning for Feature Vectors and Structured Data," arXiv:1306.6709v4 (Feb. 2014) (59 pages).

Kulis, B., "Metric Learning: A Survey. Foundations and Trends® in Machine Learning," 5(4):287-364, 2012, doi: 10.1561/2200000019.

Juan Luis Suarez-Diaz et al., "A Tutorial on Distance Metric Learning: Mathematical Foundations, Algorithms, Experimental Analysis, Prospects and Challenges (with Appendices on Mathematical Background and Detailed Algorithms Explanation)," arXiv:1812.05944v3 (Aug. 2020) (82 pages).

Panagiotis Moutafis et al., "An Overview and Empirical Comparison of Distance Metric Learning Methods," IEEE Transactions on Cybernetics (Mar. 2017) (14 pages).

Omer Tamuz et al., "Adaptively Learning the Crowd Kernel," arXiv:1105.1033v2 (Jun. 2011) (10 pages).

Laurens van der Maaten et al., "Stochastic Triplet Embedding," 2012 IEEE International Workshop on Machine Learning for Signal Processing, Sep. 2012 (6 pages).

Zou et al., "Crowdsourcing Feature Discovery via Adaptively Chosen Comparisons," arXiv:1504.00064v1 (Mar. 2015) (15 pages).

Jain et al., "Finite Sample Prediction and Recovery Bounds for Ordinal Embedding," arXiv:1606.07081v1 (Jun. 2016) (18 pages).

Yurochkin et al., "Training Individually Fair ML Models With Sensitive Subspace Robustness," International Conference on Learning Representations, Addis Ababa, Ethiopia (Mar. 2020).

Mingqing Hu et al., "Mining and Summarizing Customer Reviews," Proceedings of the tenth ACM SIGKDD International Conference on Knowledge Discovery and Data Mining, Seattle, Washington (Aug. 2004) (10 pages).

A.W. Van Der Vaart, "Weak Convergence" in Weak convergence and empirical processes, pp. 238-268. Springer, 1996.

Massart et al., "Risk Bounds for Statistical Learning," The Annals of Statistics, vol. 34, No. 5, 2326-2366 (Oct. 2006).

Davis and Kahan, "The Rotation of Eigenvectors by a Perturbation. III." SIAM Journal on Numerical Analysis, vol. 7, No. 1, pp. 1-46, Mar. 1970.

R. Vershynin, "Introduction to the non-asymptotic analysis of random matrices," arXiv:1011.3027v7 (Nov. 2011) (61 pages).

* cited by examiner

1: Input: $\{\varphi_i\}_{i=1}^n$, comparable groups $\mathcal{I}_1, \ldots, \mathcal{I}_G$ 2: $\hat{A}^T \in \arg\min_{W_g, A} \left\{ \frac{1}{2} \sum_{g=1}^{G} \left\| H_g \Phi_{\mathcal{I}_g} - W_g A^T \right\|_F^2 \right\}$ where $H_g \triangleq I_{|\mathcal{I}_g|} - \frac{1}{|\mathcal{I}_g|} 1_{|\mathcal{I}_g|} 1_{|\mathcal{I}_g|}^T$ is the centering matrix 3: $Q \leftarrow \text{qr}(\hat{A})$  ▷ get orthonormal basis of $\text{ran}(\hat{A})$ 4: $\hat{\Sigma} \leftarrow I_d - QQ^T$

FIG. 4

LEARNING MAHALANOBIS DISTANCE METRICS FROM DATA

STATEMENT REGARDING PRIOR DISCLOSURES BY THE INVENTOR OR A JOINT INVENTOR

The following disclosure(s) are submitted under 35 U.S.C. 102(b)(1)(A):

Disclosure(S):

"Two Simple Ways to Learn Individual Fairness Metrics from Data," Debarghya Mukherjee, Mikhail Yurochkin, Moulinath Banerjee, Yuekai Sun, Proceedings of the 37$^{th}$ International Conference on Machine Learning, Vienna, Austria, PMLR 108, 2020, publicly available Jun. 19, 2020 (23 pages).

FIELD OF THE INVENTION

The present invention relates to algorithmic fairness in machine learning models, and more particularly, to techniques for learning Mahalanobis distance similarity metrics from data having similarity annotation for individually fair machine learning models.

BACKGROUND OF THE INVENTION

Machine learning models are an integral part of modern decision-making pipelines. While machine learning models strive to eliminate the biases of a human decision maker, in practice they may reproduce or even exacerbate these factors in the training data.

In response, the scientific community has proposed many mathematical definitions of algorithmic fairness and approaches to ensure that machine learning models satisfy the definitions. Generally, there are two types of mathematical definitions of algorithmic fairness, group fairness and individual fairness, which define conditions for fairness at the level of groups and individuals, respectively.

Namely, group fairness divides the feature space into (non-overlapping) protected subsets and imposes invariance of the machine learning models on the subsets. Much research has focused on group fairness because it is more amenable to statistical analysis. However, despite its prevalence, group fairness has a number of notable drawbacks. For instance, it is possible for a machine learning model that satisfies group fairness to be blatantly unfair with respect to subgroups and individuals. Also, there are fundamental incompatibilities between seemingly intuitive notions of group fairness.

Individual fairness, on the other hand, treats similar individuals similarly by viewing machine learning models as maps between input and output metric spaces, and defining individual fairness as Lipschitz continuity of the machine learning models. Intuitively, individually fair machine learning models should treat similar users similarly. Thus, the crux of the definition is the fairness metric that is used on the input space as it is this metric that encodes the notion of which users are similar. Unfortunately, there is currently no widely accepted similarity metric for most machine learning tasks. Thus, to date, individual fairness has not been widely adopted.

Therefore, techniques for learning effective similarity metrics for individually fair machine learning models would be desirable.

SUMMARY OF THE INVENTION

The present invention provides techniques for learning Mahalanobis distance similarity metrics from data for individually fair machine learning models. In one aspect of the invention, a method for learning a fair Mahalanobis distance similarity metric is provided. The method includes: obtaining data with similarity annotations; selecting, based on the data obtained, a model for learning a Mahalanobis covariance matrix $\Sigma$; and learning the Mahalanobis covariance matrix $\Sigma$ from the data using the model selected, wherein the Mahalanobis covariance matrix $\Sigma$ fully defines the fair Mahalanobis distance similarity metric. The fair Mahalanobis distance similarity metric can be of a form:

$d_x(x_1, x_2) \triangleq \langle \varphi(x_1) - \varphi(x_2) \Sigma(\varphi(x_1) - \varphi(x_2)) \rangle$, wherein $\varphi(x): X \rightarrow R^d$ is an embedding map and $\Sigma \in S_+^d$.

In another aspect of the invention, another method for learning a fair Mahalanobis distance similarity metric is provided. The method includes: obtaining data of one of two types: data of a first type wherein the data includes groups of comparable samples or data of a second type wherein the data includes pairs of samples that are comparable, incomparable, or combinations thereof; selecting a factor model if the data of the first type is obtained, or a binary response model if the data of the second type is obtained; and learning a Mahalanobis covariance matrix $\Sigma$ from the data using the factor model or the binary response model, whichever is selected, wherein the Mahalanobis covariance matrix $\Sigma$ fully defines the fair Mahalanobis distance similarity metric.

A more complete understanding of the present invention, as well as further features and advantages of the present invention, will be obtained by reference to the following detailed description and drawings.

BRIEF DESCRIPTION OF THE DRAWINGS

FIG. 4 is a diagram illustrating an exemplary methodology for estimating ran $(A_*)$ by factor analysis according to an embodiment of the present invention;

DETAILED DESCRIPTION OF PREFERRED EMBODIMENTS

Figure 1:
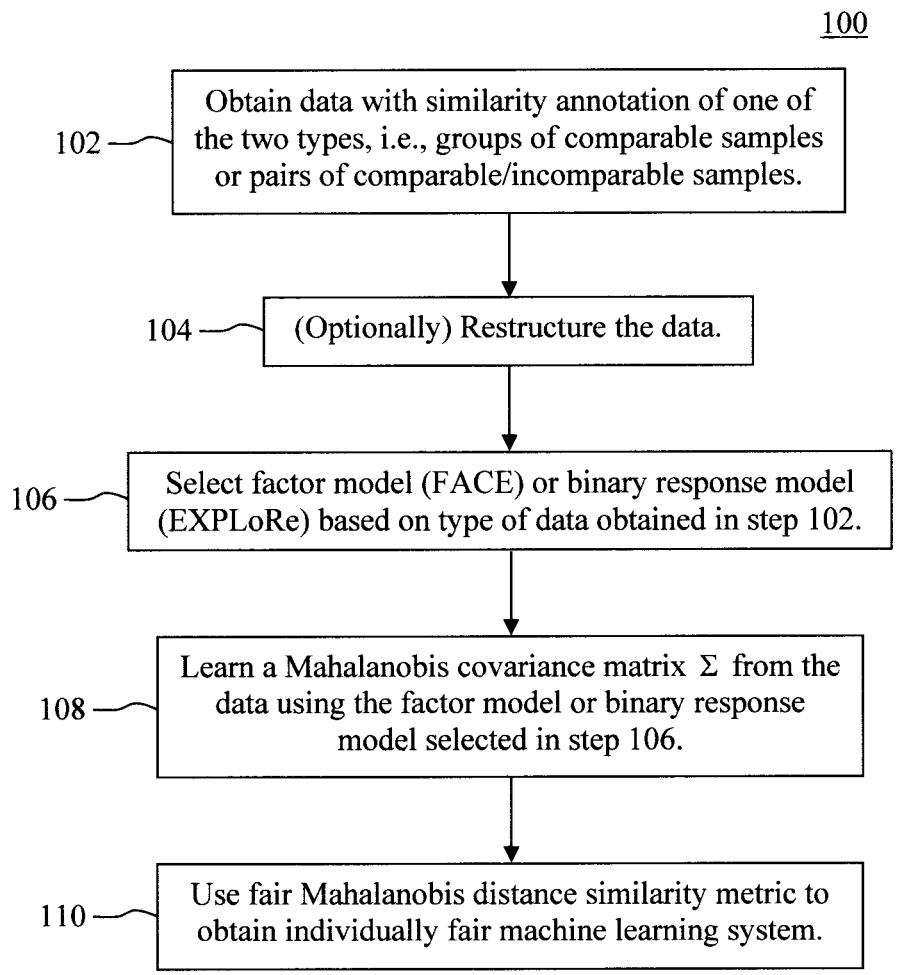
FIG. 1 is a diagram illustrating an exemplary methodology for learning fair Mahalanobis distance similarity metrics from data according to an embodiment of the present invention.

Provided herein are techniques for operationalizing individually fair machine learning models by learning Mahalanobis distance similarity metrics from data having similarity annotation. The Mahalanobis distance is a metric of distance in a multivariate space. Namely, the Mahalanobis distance measures the distance of a data point P relative to the centroid of a distribution D, whereby the centroid is representative of an overall mean of the multivariate data. For instance, the larger the Mahalanobis distance, the further away the data point P is from the centroid, and vice versa.

As will be described in detail below, in accordance with the present techniques, the Mahalanobis distance similarity metrics for individually fair machine learning models are learned from data obtained from various different data sources. For instance, according to an exemplary embodiment, the data comes from a human user's annotations or is otherwise collected using the user's knowledge of the problem. For example, suitable sources for the data include, but are not limited to, human user feedback, hand-picked groups of similar training examples, hand-crafted examples that should be treated similarly as observed training examples, and/or any combinations thereof.

For instance, the Mahalanobis distance similarity metric learning can be based on human feedback such as human annotated survey data regarding what those surveyed agreed upon as being similar, or not. Similarly, a user with knowledge of the problem can hand-pick groups of examples that he/she finds particularly suitable for similarity training. A hand-crafted example, for instance, is one where an attribute(s) in an observed training example is selectively changed by the user. It is notable that hand-picking/hand-crafting is the same as annotating.

As will also be described in detail below, a couple of different approaches are contemplated herein for learning the Mahalanobis distance similarity metric from the data with similarity annotation. For instance, in one exemplary embodiment, the data includes similar groups, and it is posited that the embedded features in the data satisfy a factor model. This embodiment is also referred to herein as 'Factor Analysis of Comparable Embeddings' or 'FACE.' According to another exemplary embodiment, the data from the data source(s) includes pair-wise comparisons, and it is posited that the data satisfies a binary response model. This embodiment is also referred to herein as 'Embedded Xenial Pairs Logistic Regression' or 'EXPLoRe.'

As will be described in detail below, which approach is used depends on the type of data obtained. For instance, a factor model as in the first approach (FACE) is well-suited for data that includes groups of comparable samples, and a binary response model as in the second approach (EXPLoRe) is well-suited for data that includes pair-wise comparisons. The approach selected can also depend on the type of data employed. For instance, if the data is accurate and consistent, then the FACE approach can lead to good results. On the other hand, if the data is noisy, then EXPLoRe tends to be more robust.

An overview of the present techniques is now provided by way of reference to methodology 100 of FIG. 1 for learning fair Mahalanobis distance similarity metrics from data. As highlighted above, two different approaches are contemplated herein for learning the Mahalanobis distance similarity metrics depending on the type of data at hand, i.e., groups of comparable and/or incomparable samples ('similar groups') for the FACE approach or pairs of comparable and/or incomparable samples ('pairwise comparisons') for the EXPLoRe approach.

Thus, the process begins in step 102 by obtaining data of one of the two types, i.e., a first type where the data includes groups of comparable samples or a second type where the data includes pairs of comparable/incomparable samples. For instance, by way of example only, data including groups of comparable samples might be text data that, when restructured (see below), includes groups of comparable word embeddings. The term 'embedding' as used herein generally refers to the process of representing discrete variables as continuous vectors. For instance, word embeddings are vector representations of a particular word, where words with similar meaning will have a similar representation. Thus, in the present context, if the text data includes Human names, then groups can be created of the embeddings for a particular name(s). By way of example only, data including pairs of comparable and/or incomparable samples might be income data whereby two individuals belonging to the same income group (e.g., individuals with an income of greater than $X_{income}$ or those with an income of less than $X_{income}$) are comparable, while two individuals belonging to different income groups are considered to be incomparable.

As highlighted above, this data may be obtained from one or more different sources. For instance, the data may be labeled with a human user's feedback obtained, for example, from human annotated survey data regarding what those surveyed agreed upon as being similar, or not. Additionally, the data obtained may be categorized in some other way to reflect the user's knowledge of the problem at hand. For instance, in addition to a human user's annotations, the data obtained in step 102 may also include hand-picked groups of similar training examples that a user with knowledge of the problem finds suitable for similarity training and/or hand-crafted examples where, e.g., a user manipulates the attributes of a training example that should be treated similarly. Thus, the data obtained in step 102 from these various different data sources has similarity annotation, meaning that it is labeled and/or categorized in some manner to reflect a user's input regarding similarity of examples in the data.

Optionally, in step 104 the data is restructured. For instance, to use the illustrative, non-limiting example from above, if the original data obtained in step 102 is text data (such as names), then in step 104 the data is restructured using word embeddings of the data. As provided above, word embeddings are vector representations of a particular word, where words with similar meaning will have a similar representation. Restructuring of the data is not necessary in all cases such as in the case of tabular data.

In step 106, a particular approach for learning the Mahalanobis distance similarity metric from the data, FACE or EXPLoRe, is selected based on the type of data obtained in step 102. For instance, as provided above, a factor model (as in the FACE approach) is contemplated herein for learning the Mahalanobis distance similarity metric from data including groups of comparable samples, while a binary response model (as in the EXPLoRe approach) is used for learning the Mahalanobis distance similarity metric from data including pairs of comparable and/or incomparable samples.

The model chosen, i.e., factor model or binary response model, will then be used to learn a covariance matrix $\Sigma$ (also referred to herein as the "Mahalanobis covariance matrix $\Sigma$"). Generally, a covariance matrix is a square matrix providing the covariance (i.e., measure of the joint variability of two random variables) between each pair of elements of a given random vector. Thus, based on the selection made in step 106 (as to the approach, i.e., FACE or EXPLoRe), the Mahalanobis covariance matrix $\Sigma$ is learned from the data in step 108 using the factor model or binary response model, respectively. The Mahalanobis covariance matrix $\Sigma$ fully defines the present fair Mahalanobis distance similarity metric. See, e.g., Equation 2.2, below.

As will be described in detail below, the factor model decomposes the variance of the learned representations into variance due to sensitive attributes and variance due to relevant attributes. The goal is to learn a similarity metric that ignores the variance attributed to the sensitive attributes but remains sensitive to the variance attributed to the relevant attributes. That way, the metric declares any pair of samples that differ mainly in their sensitive attributes as comparable. Sensitive attributes are those attributes in the data that are irrelevant to the task at hand. For instance, using the above example, if the task at hand is predicting income then attributes pertaining to what income group an individual belongs is relevant, whereas attributes (such as protected attributes) are irrelevant to the task at hand. As such, the latter are considered to be sensitive attributes. With the binary response model, a fair metric is learned from pair-wise comparisons where the data comes from human feedback which indicates whether a human user considers a pair of samples to be comparable or not.

By way of example only, in step 110 the fair Mahalanobis distance similarity metric can then be used to compare similarities of samples to arrive at fair conclusions, or inside a machine learning model to obtain an individually fair machine learning system for performing classifications or other tasks.

Generally, the present techniques are applicable to obtaining individual fairness in any type of machine learning system. By way of example only, one illustrative, non-limiting type of machine learning system is a deep neural network. In machine learning and cognitive science, deep neural networks are a family of statistical learning models inspired by the biological neural networks of animals, and in particular the brain. Deep neural networks may be used to estimate or approximate systems and cognitive functions that depend on a large number of inputs and weights of the connections which are generally unknown.

Figure 2:
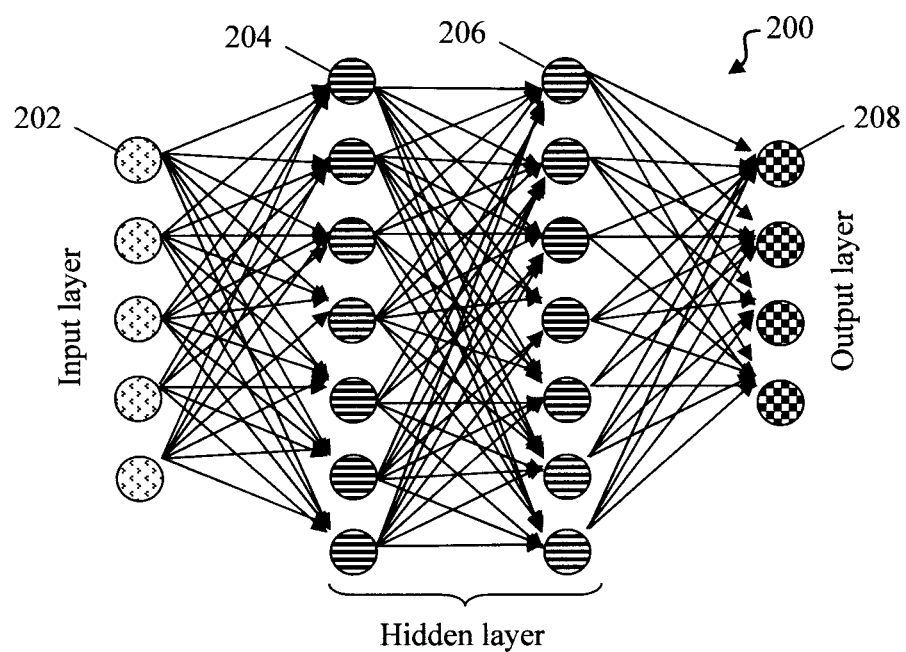
FIG. 2 is a schematic diagram illustrating an exemplary deep neural network according to an embodiment of the present invention.

Deep neural networks are often embodied as so-called "neuromorphic" systems of interconnected processor elements that act as simulated "neurons" that exchange "messages" between each other in the form of electronic signals. See, for example, FIG. 2 which provides a schematic illustration of an exemplary deep neural network 200. As shown in FIG. 2, deep neural network 200 includes a plurality of interconnected processor elements 202, 204/206 and 208 that form an input layer, at least one hidden layer, and an output layer, respectively, of the deep neural network 200. By way of example only, deep neural network 200 can be embodied in an analog cross-point array of resistive devices such as resistive processing units (RPUs).

Similar to the so-called 'plasticity' of synaptic neurotransmitter connections that carry messages between biological neurons, the connections in a deep neural network that carry electronic messages between simulated neurons are provided with numeric weights that correspond to the strength or weakness of a given connection. The weights can be adjusted and tuned based on experience, making deep neural networks adaptive to inputs and capable of learning. For example, a deep neural network for image classification is defined by a set of input neurons (see, e.g., input layer 202 in deep neural network 200) which may be activated by the pixels of an input image. After being weighted and transformed by a function determined by the network's designer, the activations of these input neurons are then passed to other downstream neurons, which are often referred to as 'hidden' neurons (see, e.g., hidden layers 204 and 206 in deep neural network 200). This process is repeated until an output neuron is activated (see, e.g., output layer 208 in deep neural network 200). The activated output neuron makes a class decision. Instead of utilizing the traditional digital model of manipulating zeros and ones, deep neural networks such as deep neural network 200 create connections between processing elements that are substantially the functional equivalent of the core system functionality that is being estimated or approximated.

Further details are now provided regarding the above-highlighted approaches, FACE and EXPLoRe. The general notion underlying individual fairness employed in accordance with the present techniques is that individually fair machine learning models should treat comparable users similarly. As highlighted above, the terms 'comparable' (or 'incomparable') are used herein to emphasize that comparable (or incomparable) samples may differ in ways that are irrelevant (relevant) to the task at hand. For instance, by way of example only, word embeddings in text data can be used to find groups of comparable samples. To find comparable and/or incomparable pairs, if the task at hand is predicting income, then two individuals belonging to the same income group (e.g., individuals with an income of greater than $X_{income}$ or those with an income of less than $X_{income}$) are comparable even though they may differ in ways that are irrelevant to the task at hand, e.g., protected attributes. By contrast, two individuals belonging to different income groups, a factor which is relevant to the task at hand, are considered to be incomparable.

Formally, a machine learning model is considered herein to be a map $h: X \to \mathcal{Y}$, where $(X, d_x)$ and $(\mathcal{Y}, d_y)$ are the input and output metric spaces, respectively. Individual fairness is an L-Lipschitz continuity of h:

$$d_y(h(x_1), h(x_2)) \le L d_x(x_1, x_2) \text{ for all } x_1, x_2 \in X, \quad (2.1)$$

wherein the choice of $d_y$ depends on the form of the output. For example, if the machine learning model outputs a vector of the logits, then the Euclidean norm may be selected as $d_y$. It is the fair metric $d_x$ that is the crux of the definition. Namely, the fair metric $d_x$ encodes which samples are comparable, i.e., which samples only differ in ways that are irrelevant to the task at hand. To date, there are no widely accepted fair metrics for most machine learning tasks. This lack of widely accepted fair metrics has led practitioners to dismiss individual fairness as impractical. Thus, the goal is to address this issue by describing two ways (FACE and EXPLoRe) to effectively learn fair metrics from data.

The starting premise is that there is generally more agreement than disagreement about what is fair in many application areas. For example, in natural language processing, there are ways of identifying groups of training examples that should be treated similarly or ways of augmenting the training set with hand-crafted examples that should be treated similarly as observed training examples. Further, even in areas where humans disagree, there are attempts to summarize the cases on which humans agree in metrics by fitting metrics to human feedback. The goal here is similar, namely to encode what is agreed up in a metric and thereby mitigate biases with methods for enforcing individual fairness.

As provided above, the Mahalanobis covariance matrix $\Sigma$ determined, e.g., in accordance with methodology 100 of FIG. 1, fully defines the fair Mahalanobis distance similarity metric. Namely, the present techniques focus on fitting metrics of the form:

$$d_x(x_1, x_2) \triangleq \langle \varphi(x_1) - \varphi(x_2) \Sigma(\varphi(x_1) - \varphi(x_2)) \rangle, \quad (2.2)$$

wherein $\varphi(x): X \to \mathbb{R}^d$ is an embedding map and $\Sigma \in S_+^d$. The reason behind choosing Mahalanobis distance is that the learned feature maps (e.g., the activations of the penultimate layer of a deep neural network) typically map nonlinear structures in the raw feature space to linear structures in the learned feature space. To keep things simple, it is assumed that φ is known, and the matrix Σ is learned from the embedded observations φ's. As detailed above, the data may be obtained from one or more different sources. For instance, the data may be labeled with a human user's feedback. Additionally, the data may be categorized in some other way to reflect the user's knowledge of the problem at hand. For instance, in addition to a human user's annotations, the data may also include hand-picked groups of similar training examples that a user with knowledge of the problem finds suitable for similarity training and/or hand-crafted examples where, e.g., a user manipulates the attributes of a training example that should be treated similarly.

Figure 3:
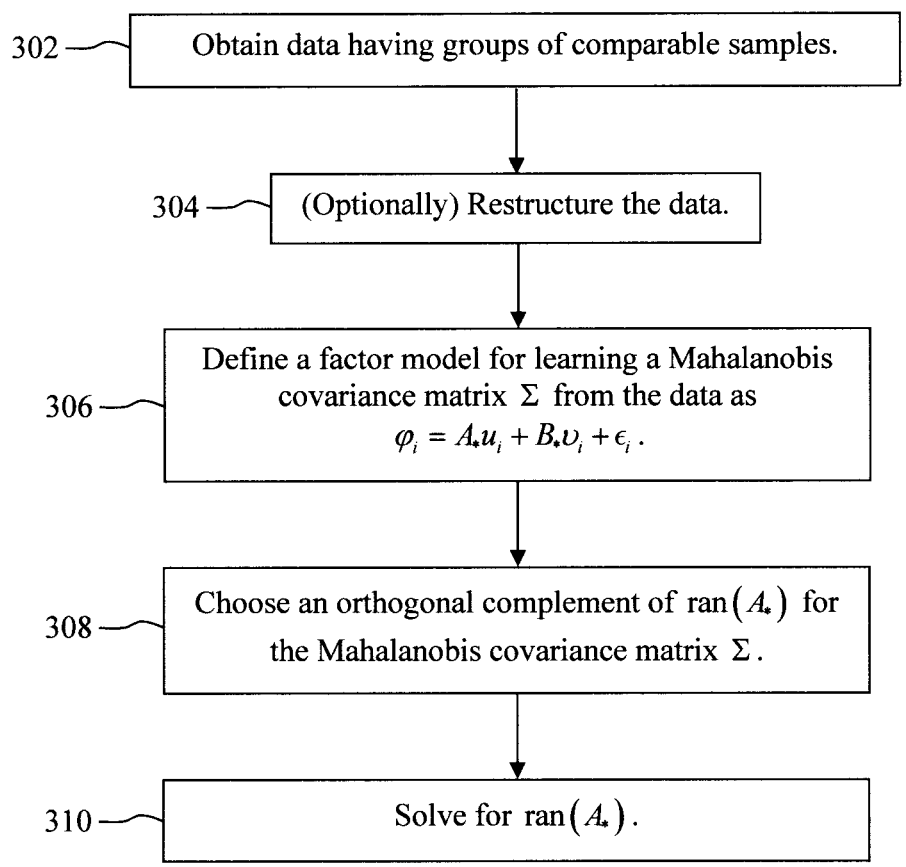
FIG. 3 is a diagram illustrating an exemplary methodology for learning a fair Mahalanobis distance similarity metric from data having groups of comparable samples using a factor model according to an embodiment of the present invention.

The first approach, FACE, for learning fair metrics from these different data sources is now described in further detail by way of reference to exemplary methodology 300 of FIG. 3. With this approach, the Mahalanobis covariance matrix Σ is learned from data obtained in step 302 having groups of comparable samples. According to an exemplary embodiment, the groups consist of hand-picked training examples and/or hand-crafted examples that differ in certain ways from observed training examples, e.g., where a user manipulates the attributes of a training example that should be treated similarly. In the same manner as described above, the data can optionally be restructured. See step 304. For instance, the data can be restructured using embedded features in the data. As highlighted above, embedding refers to the process of representing discrete variables as continuous vectors. In machine learning, the term 'features' generally refers to the individual variables a machine learning model uses as input to perform tasks, such as making predictions.

To motivate the approach, it is posited in step 306 that the embedded features in the data satisfy a factor model defined as:

$$\varphi_i = A_* u_i + B_* v_i + \epsilon_i, \quad (2.3)$$

wherein $\varphi_i \in \mathbb{R}^d$ is a learned representation of $x_i$, $u_i \in \mathbb{R}^K$ are sensitive attributes of $x_i$ for the machine learning task at hand, $v_i \in \mathbb{R}^L$ are relevant attributes of $x_i$ for the machine learning task at hand, and $\epsilon_i$ is an error term. As highlighted above, a pair of samples is comparable if the samples' relevant attributes are similar.

The factor model in Equation 2.3 decomposes the variance of the learned representations into variance due to the sensitive attributes and variance due to the relevant attributes. The factor model in Equation 2.3 is then used to learn a Mahalanobis covariance matrix Σ from the data obtained in step 302 (and optionally restructured in step 304). The goal is to learn a similarity metric that ignores the variance attributed to the sensitive attributes but remains sensitive to the variance attributed to the relevant attributes. This way, the metric declares any pair of samples that differ mainly in their sensitive attributes as comparable. According to an exemplary embodiment, in step 308 the projection matrix onto the orthogonal complement of ran $(A_*)$ is chosen for the Mahalanobis covariance matrix Σ, where ran $(A_*)$ is the column space of $A_*$. Indeed, $$d_x(x_1, x_2) = \langle \varphi_1 - \varphi_2, (I - P_{ran(A_*)})(\varphi_1 - \varphi_2) \rangle \approx \langle B_*(v_1 - v_2), (I - P_{ran(A_*)})B_*(v_i - v_2) \rangle$$

which ignores differences between $\varphi_1$ and $\varphi_2$ due to differences in the sensitive attributes. Although ran $(A_*)$ is unknown, it is possible to estimate ran $(A_*)$ (see step 310) from the learned representations and groups of comparable samples by factor analysis. For instance, by way of example only, FIG. 4 provides an exemplary methodology 400 for estimating ran $(A_*)$ by factor analysis. As shown in FIG. 4, the factor model and groups of comparable samples are provided as input (see Step 1), and used to obtain Â whose range is close to that of Â (see Step 2). In Step 3 and Step 4, the methodology 400 forms the projector onto the orthogonal complement of ran (Â). It is notable that the objective is ran $(A_*)$, not $A_*$ itself, which avoids the cumbersome identification restrictions common in factor analysis literature.

Methodology 400 is based on the observation that groups of comparable samples have similar relevant attributes, i.e., $$H\Phi_I = HU_I A_*^T \quad (2.3)$$
$$+ \mu v_{**}^{n_{R_*}}$$
$$\approx HU_I A_*^T$$
$$+ HE_I$$

wherein $$H \triangleq I_{|I|} - \frac{1}{|I|} 1_{|I|} 1_{|I|}^T$$

is the centering matrix and $\Phi_I$ (resp. $U_I, V_I$) is the matrix whose rows are the $\varphi_i$ (resp. $u_i$'s, $v_i$'s). This is the factor model that methodology 400 fits in Step 2 to obtain Â whose range is close to that of Â.

Figure 5:
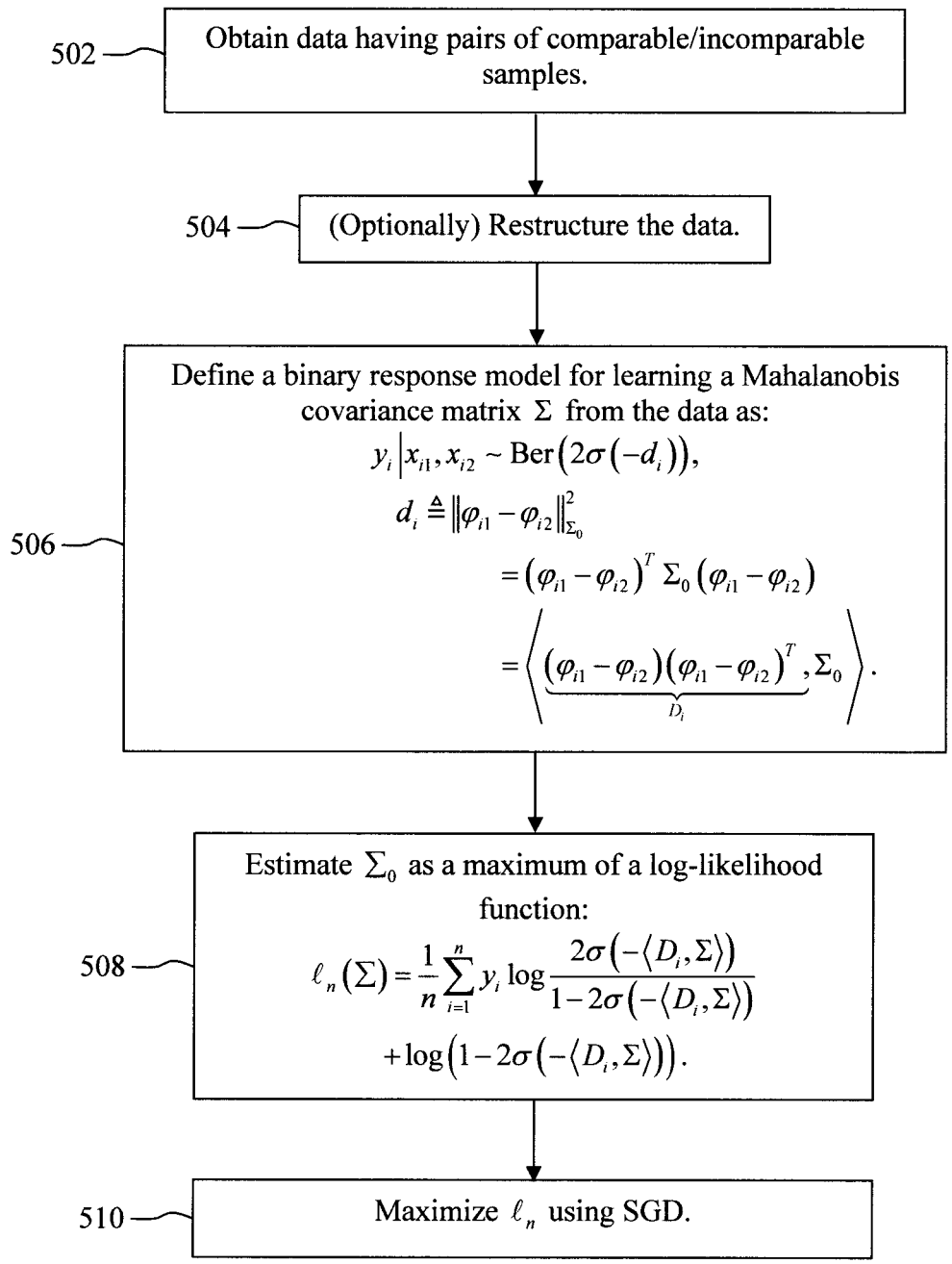
FIG. 5 is a diagram illustrating an exemplary methodology for learning a fair Mahalanobis distance similarity metric from data having pairs of comparable samples using a binary response model according to an embodiment of the present invention.

The second approach, EXPLoRe, for learning fair metrics from the different data sources is now described in further detail by way of reference to exemplary methodology 500 of FIG. 5. As highlighted above, EXPLoRe learns a fair metric from data (obtained in step 502) having pairs of comparable and/or incomparable samples. According to an exemplary embodiment, the data comes from human user feedback in the form of triplets $\{(x_{i1}, x_{i2}, y_i)\}_{i=1}^n$, where $y_i \in \{0,1\}$ indicates whether the human considers $x_{i1}$ and $x_{i2}$ to be comparable ($y_i = 1$ indicates comparable). In the same manner as described above, the data can optionally be restructured. See step 504. In step 506, it is posited that $(x_{i1}, x_{i2}, y_i)$ satisfies a binary response model:

$$y_i \mid x_{i1}, x_{i2} \sim Ber(2\sigma(-d_i)), \quad (2.5)$$

$$d_i \triangleq \|\varphi_{i1} - \varphi_{i2}\|_{\Sigma_0}^2$$
$$= (\varphi_{i1} - \varphi_{i2})^T \Sigma_0 (\varphi_{i2} - \varphi_{i2})$$
$$= \langle \underbrace{(\varphi_{i1} - \varphi_{i2})(\varphi_{i1} - \varphi_{i2})^T}_{D_i}, \Sigma_0 \rangle,$$

wherein $$\sigma(z) \triangleq \frac{1}{1 + e^{-z}}$$

is the logistic function, $\varphi_{i1}$ is the learned representations of $x_{i1}$, $\varphi_{i2}$ is the learned representations of $x_{i2}$, and $\Sigma_0 \in S_+^d$. The reason for multiplying by 2 is to make $P(y_i=1|x_{i1},x_{i2})$ close to 1 when $\varphi_{i1}$ is close to $\varphi_{i2}$ with respect to this scaled distance. This ensures that if there are two comparable samples, then the corresponding $y_1=1$ with high probability. The binary response model in Equation 2.5 is then used to learn a Mahalanobis covariance matrix $\Sigma$ from the data obtained in step 502 (and optionally restructured in step 504). To do so, in step 508, $\Sigma_0$ is estimated from the human user's feedback as a maximum of the log-likelihood function:

$$\ell_n(\Sigma) = \frac{1}{n}\sum_{i=1}^n y_i \log \frac{2\sigma(-\langle D_i, \Sigma\rangle)}{1 - 2\sigma(-\langle D_i, \Sigma\rangle)} \quad (2.6)$$
$$+ \log(1 - 2\sigma(-\langle D_i, \Sigma\rangle))$$

on $S_+^d$. Since $\ell_n$ is concave (in $\Sigma$), in step 510 a stochastic gradient descent (SGD) process is used to maximize $\ell_n$. According to an exemplary embodiment, the update rule is $$\Sigma_{t+1} = \text{ProjPSD}(\Sigma_t + \eta_t \partial \tilde{\ell}_n(\Sigma_t)),$$

wherein $\tilde{\ell}_n$ is the likelihood of the t-th minibatch, $\eta_t >$ is a step size parameter, and ProjPSD is the projection onto the positive semidefinite (PSD) cone.

The choice of which approach (FACE versus EXPLoRe) to use seems clear from the data. For instance, if the data includes groups of comparable samples, then the factor analysis approach is appropriate. On the other hand, if data includes pair-wise comparisons, then the logistic-regression approach is more appropriate. However, the type of data is often part of the design, so the question may be rephrased as to which type of data should the learner solicit. Further, if the data is accurate and consistent, then the FACE approach will lead to good results. However, if the data is noisy, then the EXPLoRe approach is more robust.

The core issue is a bias variance trade-off. Data in the form of a large group of comparable samples is more informative than pair-wise comparisons. As the FACE approach is capable of fully utilizing this form of supervision, it leads to estimates with smaller variance. However, the FACE approach is also more sensitive to heterogeneity within the groups of comparable samples, as the FACE approach is fully unbiased if all of the variation in the group can be attributed to the sensitive attribute. If some of the variation is due to the relevant attributes, then FACE leads to biased estimates. On the other hand, EXPLoRe imposes no conditions on the homogeneity of the comparable and incomparable pairs in the training data. While EXPLoRe cannot fully utilize comparable groups of size larger than two, it is also more robust to heterogeneity in the pairs of samples in the training data.

Thus, in the end, a key factor is whether it is possible for human users to provide homogeneous groups of comparable samples. In some applications, there are homogeneous groups of comparable samples. For example, in natural language processing, names are a group of words that ought to be treated similar in many machine learning tasks. For such applications, the factor analysis approach usually leads to better results. In other applications where there is less consensus on whether samples are comparable, the logistic regression approach usually leads to better results. FACE and EXPLoRe can be envisioned as the first stage in a pipeline for training individually fair machine learning models.

The theoretical properties of FACE are now described. Proofs and theoretical properties of EXPLoRe are provided below. The FACE approach involves learning the fair metric from groups of comparable samples by pairwise comparison. Namely, having groups of comparable samples provides comparable pairs, i.e., any two samples in the group. For instance, given a pair $(\varphi_{i,1}, \varphi_{i,2})$ (the embedded version of $(x_{i,1}, x_{i,2})$), it is defined for notational simplicity that $z_i = \varphi_{i1} - \varphi_{i2}$. Here, only those $z_i$'s are considered which come from a comparable pair, i.e., with corresponding $y_i=1$. Under the assumption of a factor model (see Equation 2.3 above):

$$z_i = \varphi_{i1} - \varphi_{i2} \quad (3.1)$$
$$= A_*(u_{i1} - u_{i2}) + B_*(v_{i1} - v_{i2}) + (\epsilon_{i1} - \epsilon_{i2})$$
$$= A_*\mu_i + B_*\nu_i + w_i.$$

It is assumed that the sensitive attributes have more than one dimension which corresponds to the setting of intersectional fairness (e.g., in order to mitigate bias). It is also assumed that the $\mu_i$'s and $\upsilon_i$'s are isotropic, the variance of $w_i$ is $\sigma^2 I_d$ and that $\mu_i$, $\upsilon_i$, $w_i$ are all independent of each other. The scalings of $\mu_i$ and $\upsilon_i$ are taken care of by the matrices $A_*$ and $B_*$, respectively. $\Sigma_z$ is the covariance matrix of $z_i$'s. From the model in Equation 3.1 and the aforementioned assumptions:

$$\Sigma_z = A_* A_*^T + B_* B_*^T + \sigma^2 I_d \quad (3.2)$$

It is assumed that the dimension of the sensitive direction is known beforehand, which is denoted by k here. As $\phi_{i1}$ is comparable to $\phi_{i2}$, it is expected that variability along the protected attribute is dominant. The term 'protected attribute' as used herein refers to the features of the data that are not relevant to the task at hand. It is assumed that $\lambda_{min}(A_* A_*^T) > \|B_* B_*^T + \sigma^2 I_d\|_{op}$. Here, the fair metric being learned is:

$$d_x(x_1, x_2) = \langle (\varphi_1 - \varphi_2), \Sigma_0(\varphi_1 - \varphi_2) \rangle$$

wherein $\Sigma_0 = (I - P_{ran(A_*)})$. To estimate (and hence eliminate) the effect of the protected attribute, the singular value decomposition (SVD) is computed of the sample covariance matrix $$S_n = \frac{1}{n}\sum_{i=1}^n z_i z_i^T$$

of the $z_i$'s, and the eigen-space corresponding to the top k eigenvectors is projected out, denoted by $\hat{U}$. The estimated distance metric will be:

$$\hat{d}_x(x_1, x_2) = \langle (\varphi_1 - \varphi_2), \hat{E}(\varphi_1 - \varphi_2) \rangle,$$

wherein $\hat{\Sigma} = (I - \hat{U}\hat{U}^T)$.

The following Theorem 3.1. quantifies the statistical error of the estimator: Suppose $z_i$'s are centered sub-gaussian random vectors, i.e., $\|z_i\|_{\psi_2} < \infty$, wherein $\psi_2$ is the Orlicz-2 norm. Then, with probability at-least $1 - 2e^{-ct^2}$:

$$\left\|\hat{\Sigma} - \Sigma_0\right\|_{op} \leq b + \frac{\delta \vee \delta^2}{\hat{\gamma} - (\delta \vee \delta^2)} \quad (3.3)$$

for all $t<(\sqrt{n\tilde{\gamma}}-C\sqrt{d})\wedge(\sqrt{n\tilde{\tilde{\gamma}}}-C\sqrt{d})$, wherein:

1. $b = \left(\dfrac{\lambda_{min}(A_*A_*^T)}{\|B_*B_*^T + \sigma^2 I_d\|_{op}} - 1\right)^{-1}$ 2. $\delta = \dfrac{C\sqrt{d}+t}{\sqrt{n}}$.

3. $\tilde{\gamma} = \lambda_{min}(A_*A_*^T) - \|B_*B_*^T\|_{op}$.

The constants C, c depend only on $\|x_i\|_{\psi_2}$, the Orlicz-2 norm of the $x_i$'s.

The error bound on the right side of Equation 3.3 includes two terms. The first term b is the approximation error/bias in the estimate of the sensitive subspace due to heterogeneity in the similar pairs. Inspecting the form of b reveals that the bias depends on the relative sizes of the variation in the sensitive subspace and that in the relevant subspace: the larger the variation in the sensitive subspace relative to that in the relevant subspace, the smaller the bias. In the ideal scenario where there is no variation in the relevant subspace, Theorem 3.1 implies that the estimator converges to the sensitive subspace. The second term is the estimation error, which vanishes at the usual $$\dfrac{1}{\sqrt{n}} - \text{rate.}$$

In light of the assumptions on the sub-Gaussianity of the $z_i$'s, this rate is expected.

The complementary setting is now considered in which there is a single group of n comparable samples, and learning is done from group-wise comparisons. A factor model for the features is provided as:

$$\varphi_i = m + A_*\mu_i + B_*\upsilon_i + \epsilon_i, i=1,2,\ldots,n, \quad (3.4)$$

wherein $m \in R^d$ is a mean term that represents the common effect of the relevant attributes in this group of comparable samples, $A_*\mu_i$ represents the variation in the features due to the sensitive attributes, and $B_*\upsilon_i$ represents any residual variation due to the relevant attributes (e.g., the relevant attributes are similar but not exactly identical). As before, it is assumed that the $\mu_i$, $v_i$'s are isotropic, $Var(\epsilon_i)=\sigma^2 I_d$ and the scale factors of $\mu_i$'s and $v_i$'s are taken care of by the matrices $A_*$ and $B_*$, respectively, due to identifiability concerns. In other words, the magnitudes of $B_*v_i$'s are uniformly small. As the residual variation among the samples in this group due to the relevant factors is small, it is assumed that $B_*$ is small compared to $A_*$, which can be quantified as before by assuming that $\lambda_{min}(A_*A_*^T) > \|B_*B_*^T + \sigma^2 I\|$. Hence, to remove the effect of protected attributes, the column space of $A_*$ is estimated from the sample and then projected out. From the above assumptions, the (centered) dispersion matrix of $q_i$ can be written as:

$$\Sigma_\varphi = A_*A_*^T + B_*B_*^T + \sigma^2 I.$$

It is notable that the structure of $\Sigma_z$ in the description above is the same as $\Sigma_\varphi$ since z is merely the difference of two $\varphi$'s. As before, it is assumed that the dimension of the protected attributes is known, which is denoted by k. The top k eigenvalues of $$S_n = \dfrac{1}{n}\sum_{i=1}^n \varphi_i\varphi_i^\top$$

are denoted by $\hat{U}$. The final estimate of $\Sigma_0$ is $\hat{\Sigma}=(I-\hat{U}\hat{U}^T)$ and the corresponding estimated fair metric becomes:

$$d_x(x_1,x_2) = \langle(\varphi_1-\varphi_2), \hat{\Sigma}(\varphi_1-\varphi_2)\rangle.$$

Theorem 3.2. that follows provides a finite sample concentration bound on the estimation error: Assume that $\varphi_i$ have subgaussian tail, i.e., $\|\varphi_i\|_{\psi_2} 21 \infty$. Then, with probability $\geq 1-2e^{-ct^2}$:

$$\|\hat{\Sigma}-\Sigma_0\|_{op} \leq b + \dfrac{\delta \vee \delta^2}{\tilde{\gamma}-(\delta\vee\delta^2)} + \dfrac{t}{n}$$

for all $t<(\sqrt{n\tilde{\gamma}}-C\sqrt{d})\wedge(\sqrt{n\tilde{\tilde{\gamma}}}-C\sqrt{d})$ where:

1. $b = \left(\dfrac{\lambda_{min}(A_*A_*^T)}{\|B_*B_*^T + \sigma^2 I_d\|_{op}} - 1\right)^{-1}$ 2. $\delta = \dfrac{C\sqrt{d}+t}{\sqrt{n}}$.

3. $\tilde{\gamma} = \lambda_{min}(A_*A_*^T) - \|B_*B_*^T\|_{op}$.

The constants C,c only depend on the subgaussian norm constant of $\phi_i$.

The error bound provided by Theorem 3.2 is similar to the error bound provided by Theorem 3.1 and consists of two terms. The first term $\overline{B}$ is again the approximation error/bias in the estimate of the sensitive subspace due to heterogeneity in the group. $\overline{B}$ has the same form as the bias as in Theorem 3.1, and has a similar interpretation. The second term is the estimation error, which is also similar to the estimation error term in Theorem 3.1. The third term is the error incurred in estimating the mean of the $\varphi_i$'s. It is a higher order term and does not affect the rate of convergence of the estimator.

In one exemplary embodiment, individually fair machine learning models were trained using the FACE approach and Sensitive Subspace Robustness (SenSR). See, for example, Yurochkin et al., "Training Individually Fair NL Models With Sensitive Subspace Robustness," International Conference on Learning Representations, Addis Ababa, Ethiopia (March 2020) (hereinafter "Yurochkin"). To keep things concise, the notation of Yurochkin was adopted.

The assumptions on the machine learning task are stated as follows:

1. It is assumed that the embedded feature space of $\varphi$ is bounded $R \triangleq \max\{diam(\varphi), diam_*(\varphi)\} < \infty$, where $diam_*$ is the diameter of $\varphi$ in the (unknown) exact fair metric $$d_x^*(x_1, x_2) = \langle(\varphi_1-\varphi_2), \Sigma_0(\varphi_1-\varphi_2)\rangle^{1/2},$$

and diam is the diameter in the learned fair metric $$d_x(x_1, x_2) = \langle(\varphi_1-\varphi_2), \hat{\Sigma}(\varphi_1-\varphi_2)\rangle^{1/2}.$$

2. $\mathcal{L} = \{ \ell(\bullet,\theta): \theta \in \Theta \}$ is defined as the loss class. It is assumed that the functions in the loss class $\mathcal{L} = \{ \ell(\bullet,\theta): \theta \in \Theta \}$ are non-negative and bounded: $0 \leq \ell(z, \theta) \leq M$ for all $z \in Z$ and $\theta \in \Theta$, and L-Lipschitz with respect to $d_x$:

3. the discrepancy in the fair metric is uniformly bounded: there is $\delta_c > 0$ such that $$\sup_{(x_1, x_2) \in Z} |d_x^2(x_1, x_2) - (d_x^*(x_1, x_2))^2| \leq \delta_c R^2.$$

The third assumption is satisfied with high probability as long as $$\delta_c \geq \left( b + \frac{\delta \vee \delta^2}{\hat{\gamma} - (\delta \vee \delta^2)} \right).$$

As per a Theorem 3.3, under the preceding assumptions, if $\delta^* \geq 0$ is defined such that:

$$\min_{\theta \in \Theta} \sup_{P: W_*(P, P_*) \leq \epsilon} E_P[\ell(Z, \theta)] = \delta^* \quad (3.5)$$

and $$\hat{\theta} \in \arg\min_{\theta \in \Theta} \sup_{P: W(P, P_n) \leq c} E_P[\ell(Z, h)],$$

then the estimator $\hat{\theta}$ satisfies:

$$\sup_{P: W(P, P_n) \leq c} E_P[\ell(Z, \hat{\theta})] - E_{P_*}[\ell(Z, \hat{\theta})] \leq \delta^* + 2\delta_n, \quad (3.6)$$

wherein W and $W_*$ are the learned and exact fair Wasserstein distances induced by the learned and exact fair metrics (see Section 2.1 in Yurochkin) and $$\delta_n \leq \frac{48 \mathfrak{C}(\mathcal{L})}{\sqrt{n}} + \frac{48 L R^2}{\sqrt{n\epsilon}} + \frac{L \delta_c R^2}{\sqrt{\epsilon}} + M \left( \frac{\log \frac{2}{t}}{2n} \right)^{\frac{1}{2}},$$

wherein $\mathfrak{C}(\mathcal{L}) = \int_0^\infty \sqrt{\log(\mathcal{N}_*(\mathcal{L}, r))} \, dr$, with $\mathcal{N}_{2B}(\mathcal{L}, r)$ being the covering number of the loss class $\mathcal{L}$ with respect to the uniform metric.

Theorem 3.3 guarantees that the FACE approach in conjunction with SenSR trains an individually fairML model in the sense that its fair gap (see Equation 3.6 above) is small. Intuitively, a small fair gap means it is not possible for an auditor to affect the performance of the machine learning model by perturbing the training examples in certain "sensitive" ways. The same conclusion can also be drawn using Theorem 3.2 with an essentially similar line of arguments.

The theory of EXPLoRe is same in spirit with the theory of FACE. In EXPLoRe, the fair metric is learned from comparable and/or incomparable pairs. As described above, the maximum likelihood estimator (MLE) is solved under the assumption of quadratic logit link to estimate $\Sigma_0$. Under the assumption that the parameter space and the space of embedded covariates ($\varphi(x)$) are bounded, the finite sample concentration bound of the estimator can be established. It is also possible to combine the results with those of Yurochkin to obtain guarantees on the individual fairness of machine learning models trained with EXPLoRe and SenSR (see below).

The performance of the learned metrics on machine learning tasks such as eliminating biased word embeddings associations was investigated, and it was found that replacing the metric on the word embedding space with a fair metric learned by FACE or EXPLoRe eliminates most biases in word embeddings. Many recent works have observed biases in word embeddings such as through a series of Word Embedding Association Tests (WEATs). The tests are inspired by implicit association tests (IAT) from the psychometrics literature. X, $\mathcal{Y}$ are two sets of word embeddings of target words of equal size, and A, B are two sets of attribute words (e.g., words with positive and negative sentiment, respectively). For each word $x \in X$, its association with the attribute is measured by $$s(x, \mathcal{A}, \mathcal{B}) \triangleq \frac{1}{|\mathcal{A}|} \sum_{a \in \mathcal{A}} \frac{\langle x, a \rangle}{\|x\|\|a\|} - \frac{1}{|\mathcal{B}|} \sum_{b \in \mathcal{B}} \frac{\langle x, b \rangle}{\|x\|\|b\|}. \quad (4.1)$$

If x tends to be associated with the attribute (e.g., it has positive or negative sentiment), then s(x,A,B) is expected to be far from zero. To measure the association of X with the attribute, the associations of the words in X are averaged:

$$s(\mathcal{X}, \mathcal{A}, \mathcal{B}) \triangleq \frac{1}{|\mathcal{X}|} \sum_{x \in \mathcal{X}} s(x, \mathcal{A}, \mathcal{B}).$$

The absolute difference between the associations of X and Y with the attribute is used as a test statistic:

$$s(\mathcal{X}, \mathcal{Y}, \mathcal{A}, \mathcal{B}) \triangleq |s(\mathcal{X}, \mathcal{A}, \mathcal{B}) - s(\mathcal{Y}, \mathcal{A}, \mathcal{B})|.$$

Under the null hypothesis, X and $\mathcal{Y}$ are equally associated with the attribute. This suggests that the test be calibrated by permutation. $\{(X_\sigma, Y_\sigma)\}_\sigma$ is the set of all partitions of $X \cup \mathcal{Y}$ into two sets of equal size. Under the null hypothesis, s (X, $\mathcal{Y}$, $\mathcal{A}$, $\mathcal{B}$) should be typical among the values of $\{s(X_\sigma, \mathcal{Y}_\sigma, \mathcal{A}, \mathcal{B})\}$. The "atypicality" of s(X, $\mathcal{Y}$, $\mathcal{A}$, $\mathcal{B}$) is summarized with a two-sided p-value:

$$P = \frac{\Sigma_\sigma 1\{s(\mathcal{X}_\sigma, \mathcal{Y}_\sigma, \mathcal{A}, \mathcal{B}) > s(\mathcal{X}, \mathcal{Y}, \mathcal{A}, \mathcal{B})\}}{\text{card}(\{X_\sigma, Y_\sigma\}_\sigma)}.$$

A standardized effect size was also found $$d = \frac{s(\mathcal{X}, \mathcal{Y}, \mathcal{A}, \mathcal{B})}{SD(\{s(x, \mathcal{A}, \mathcal{B})\}_{x \in \mathcal{X} \cup \mathcal{Y}})}$$

for a more fine-grained comparison of the methods.

With regard to learning EXPLoRe and FACE, in order to apply the present fair metric learning approaches a set of comparable samples for FACE and a collection of comparable and incomparable pairs for EXPLoRe were defined. For the set of comparable samples for FACE embeddings of a side dataset of 1200 popular human names in were chosen. The motivation is two-fold: (i) from the perspective of individual fairness, it is reasonable to say that human names should be treated similarly in natural language processing tasks; (ii) multiple prior works have observed that names capture biases in word embeddings and used them to improve fairness in classification tasks. See, e.g., Yurochkin. Three choices were considered for the number of factors of FACE: 3, 10 and 50.

For EXPLoRe, comparable pairs were constructed by sampling pairs of names from the same pool of names, however because there are too many unique pairs, a random 50k of them were subsampled. To generate the incomparable pairs, a random 50k pairs of positive and negative customer reviews sampled from the dataset proposed by Mingqing Hu et al., "Mining and Summarizing Customer Reviews," Proceedings of the tenth ACM SIGKDD International Conference on Knowledge Discovery and Data Mining, Seattle, Washington (August 2004) (10 pages) were considered for the task of sentiment classification.

Regarding WEATs results, it was first clarified how the associations (see Equation 4.1 above) are computed for different methods. The Euclidean approach is to use word embeddings and directly compute associations in the basic Euclidean space. Word embeddings can also be debiased before computing associations. Associations with FACE and EXPLoRe are computed in the Mahalanobis metric space parametrized by a corresponding $\Sigma$, i.e., the inner product $\langle x, y \rangle = x^T \Sigma y$ and norm $\|x\| = \sqrt{\langle x, \Sigma x \rangle}$. When computing P, if the number of partitions of target words card $(\{(X_\sigma, Y_\sigma)\}_\sigma)$ is too big, 50k partitions can be subsampled.

WEATs were evaluated with the exact same target and attribute word combinations. First, it was verified that all of the methods preserve the celebrated ability of word embeddings to represent semantic contexts and all p-values are small corresponding to the significance of the associations. By contrast, in the case of associations that can lead to biases in AI systems utilizing word embeddings, a larger p-value P and smaller effect size d are desired. Advantageously, the present fair metric learning approaches EXPLoRe and FACE (with 50 factors) each successfully removed 5 out of 7 unfair associations, including ones not related to names.

The relation between groupwise and pairwise comparison is now described. In the case of pairwise comparison, $|I_1|==|I_G|=2$. As mentioned in conjunction with the description of methodology 400 of FIG. 4 above, each group is first mean centered, which is assumed to nullify the variability along the directions of the relevant attributes. For instance, considering $I_1 = \{\varphi_{1_1}, \varphi_{1_2}\}$, then:

$$H\Phi_{I_1} = \left(\varphi_{1_1} - \frac{\varphi_{1_1} + \varphi_{1_2}}{2}, \varphi_{1_2} - \frac{\varphi_{1_1} + \varphi_{1_2}}{2}\right)^T$$

$$= \left(\frac{\varphi_{1_1} + \varphi_{1_2}}{2}, \frac{\varphi_{1_2} - \varphi_{1_1}}{2}\right)^T$$

Hence the combined matrix can be written as:

$$M_{pairs} = \frac{1}{4|G|} \sum_{i=1}^{|G|} (\varphi_{i_1} - \varphi_{i_2})(\varphi_{i_1} - \varphi_{i_2})^T$$

which is equivalent to consider the difference between the pairs of each individual groups (up to a constant). On the other hand, when there are more than two observations in each group, the grand matrix following methodology 400 becomes:

$$M_{general} = \frac{1}{N} \sum_{i=1}^{G} \sum_{j=1}^{|I_G|} (\varphi_{i_j} - \overline{\varphi}_i)(\varphi_{i_j} - \overline{\varphi}_i)^T,$$

wherein $N = \sum_{i=1}^{G} |I_G|$ is the total number of observations. Hence, in the case of $|I_G|=2$, mean centering is not needed since the difference is being taken between the observations of each pair. When G is essentially fixed, i.e., $|I_G| \approx N$, the error in estimating $ranA_*$ due to mean centering contributes a higher order term (see Theorem 3.2 above for more details) which is essentially negligible. Although there is no error due to mean centering in the case of pairwise comparison, one observation is effectively lost in each pair.

A description of the theoretical properties of EXPLoRe is now provided. Here, statistical guarantees corresponding to the estimation are provided using the scaled logistic link (see above). To keep things simple, Equation 2.5 above is modified so that it is strongly identifiable:

$$y_i | z_{i_1}, z_{i_2} \sim Ber((2-\epsilon)\sigma(-\langle D_i, \Sigma_0 \rangle))$$

for some small $\epsilon > 0$. The log-likelihood of samples $(x_1, y_1), \ldots, (x_n, y_n)$ is $$\ell_n(\Sigma) = \frac{1}{n} \sum_{i=1}^{n} \left[y_i \log F_*\left(x_i' \sum x_i\right)\right] + (1 - y_i) \log\left(1 - F_*\left(x_i' \sum x_i\right)\right),$$

wherein $F_* = (2 = \epsilon)\sigma$.

According to a Proposition B.1, the population version of the likelihood function $\ell(\Sigma)$ is concave in $\Sigma$ and uniquely maximized at $\Sigma_0$. As a proof, the population version of the likelihood function is:

$$\ell(\Sigma) = E[Y \log F_*(X'\Sigma X) + (1-Y)\log(1-F_*(X'\Sigma X))] = g(X'\Sigma X). \quad (B.1)$$

As the function $\Sigma \to X'\Sigma X$ is affine in $\Sigma$, it only needs to be shown that g is concave. From Equation B.1, the function $g(.)$ can be defined as: $g(t) = y \log F_*(t) + (1-y)\log(1-F_*(t))$ on $t \in \mathbb{R}^*$ for any fixed $y \in \{0,1\}$. The function $F_*$ is double differentiable with the derivatives as below:

$$F_*(x) = \frac{2-\epsilon}{1+e^t}, \quad 1 - F_*(t) = \frac{e^t - 1 + \epsilon}{1 + e^t}$$

$$F_*'(t) = -(2-\epsilon)\frac{e^t}{(1+e^t)^2}$$

$$F_*''(t) = -(2-\epsilon)\frac{e^t(1-e^t)}{(1+e^t)^3}$$

It is shown below that $g''(t) \leq 0$ for all t which proves the concavity of $l(\Sigma)$:

$$g(t) = y \log F_*(t) + (1-y)\log(1-F_*(t)) \quad (B.2)$$

$$\Rightarrow g'(t) = y \frac{F_*'(t)}{F_*(t)} - (1-y)\frac{F_*'(t)}{1 - F_*(t)}$$

$$\Rightarrow g''(t) = y \frac{F_*(t)F_*''(t) - (F_*'(t))^2}{F_*^2(t)} - (1-y)\frac{(1-F_*(t))F_*''(t) + (F_*'(t))^2}{(1-F_*(t))^2}$$

For the first summand in the double derivative:

$$\frac{F_*(t)F_*''(t) - (F_*'(t))^2}{F_*^2(t)} = \frac{-(2-\epsilon)^2 \frac{e^t(1-e^t)}{(1+e^t)^4} - (2-\epsilon)^2 \frac{e^{2t}}{(1+e^t)^4}}{\frac{(2-\epsilon)^2}{(1+e^t)^4}} \quad (B.3)$$

$$= -\frac{e^t(1-e^t) + e^{2t}}{(1+e^t)^2} = -\frac{e^t}{(1+e^t)^2} < 0 \, \forall \, t \in \mathbb{R}^+$$

For the second summand:

$$\frac{(1-F_*(t))F_*''(t)+(F_*'(t))^2}{(1-F_*(t))^2} = \frac{-(2-\epsilon)\frac{(e^t-1+\epsilon)e^t(1-e^t)}{(1+e^t)^4}+(2-\epsilon)^2\frac{e^{2t}}{(1+e^t)^4}}{\frac{(e^t-1+\epsilon)^2}{(1+e^t)^2}} \quad (B.4)$$

$$= \frac{(2-\epsilon)\left[(2-\epsilon)e^{2t}-(e^t-1+\epsilon)e^t(1-e^t)\right]}{(e^t-1+\epsilon)^2(1+e^t)^2}$$

$$= \frac{(2-\epsilon)\left[(2-\epsilon)e^{2t}+(e^t-1+\epsilon)e^t(e^t-1)\right]}{(e^t-1+\epsilon)^2(1+e^t)^2} \geq 0 \,\forall\, t \in \mathbb{R}^+$$

Equations B.2, B.3 and B.4 are then combined as:

$$g''(t) =$$

$$-y\frac{e^t}{(1+e^t)^2}-(1-y)\frac{(2-\epsilon)\left[(2-\epsilon)e^{2t}+(e^t-1+\epsilon)e^t(e^t-1)\right]}{(e^t-1+\epsilon)^2(1+e^t)^2} < 0 \,\forall\, t \in \mathbb{R}^+$$

This proves the strict concavity. To prove that $\Sigma_0$ is the unique maximizer, it is observed that:

$$\ell\left(\sum\right) = E\left[Y\log F_*\left(X'\sum X\right)+(1-Y)\log\left(1-F_*\left(X'\sum X\right)\right)\right]$$

$$= E\left[F_*\left(X'\sum_0 X\right)\log F_*\left(X'\sum X\right)+\left(1-F_*\left(X'\sum_0 X\right)\right)\log\left(1-F_*\left(X'\sum X\right)\right)\right]$$

$$= \ell\left(\sum_0\right)-E\left(KL\left(Bern\left(F_*\left(X'\sum_0 X\right)\right)\|Bern\left(F_*\left(X'\sum X\right)\right)\right)\right).$$

Hence, $\ell(\Sigma_0) \geq \ell(\Sigma)$ for all $\Sigma \in \Theta$ as KL divergence is always non-negative. Next, if $\Sigma_1$ is allowed to be any other maximizer, then, $E(KL(\text{Bern}(F_*(X'\Sigma_0 X))\text{Bern}(F_*(X'\Sigma X))))=0$ $\Rightarrow KL(\text{Bern}(F_*(X'\Sigma_0 X))\|\text{Bern}(F_*(X'\Sigma X)))=0$ a.s. in $X$ $\Rightarrow F_*(X'\Sigma_0 X)=F_*(X'\Sigma X)$ a.s. in $X$ $\Rightarrow X'(\Sigma-\Sigma_0)X=0$ a.s. in $X$ $\Rightarrow \Sigma=\Sigma_0$ as the interior of the support of X is non null. This proves the uniqueness of the maximizer. The maximum likelihood estimator (MLE) $\hat{\Sigma}$ is:

$\hat{\Sigma}=\arg\max_\Sigma \ell_n(\Sigma)$

The asymptotic properties of $\hat{\Sigma}$ (consistency and asymptotic normality) are well-established in the statistical literature. Here, the non-asymptotic convergence rate of the MLE is analyzed. The following assumptions are made as follows:

Assumption B.2, the feature space X is a bounded subset of $\mathbb{R}^d$, i.e., there exists $R<\infty$ such that $\|X\|=\|\varphi_1-\varphi_2\|\leq U$ for all $X\in X$.

Assumption B.3, the parameter space $\Theta$ is a subset of $s_{++}^d$ and $\sup\{\lambda_{max}(\Sigma):\Sigma\in\Theta\}\leq C_+<\infty$.

Under these assumptions, a finite sample concentration result is established for the estimator $\hat{\Sigma}$:

According to a Theorem BA, under Assumptions B.2 and B.3, $\sqrt{n}\|\hat{\Sigma}-\Sigma_0\|_{op}\leq t$ with probability at least $1-e^{-bt^2}$ for some constant $b>0$.

As a proof, the theorem is broken down into a few small lemmas. For instance, the collection $\mathcal{G}=\{g_\Sigma:\Sigma\in\Theta\}$ is considered, wherein $g_\Sigma(X,Y)=[nog F_*(X'\Sigma X)+(1-Y)\log(1-F(X'\Sigma X))]$.

The problem of estimating $\Sigma_0$ using MLE can be viewed as a risk minimization problem over the collection of functions $\mathcal{G}$, see below. A Lemma B.5 is given below that provides a lower bound on the deviation of $l(\Sigma)$ from $l(\Sigma_0)$ in terms of $\|\Sigma-\Sigma_0\|_{op}$.

Namely, as per Lemma B.5, under Assumptions B.2 and B.3 there is a quadratic lower bound on the excess risk:

$\ell(\Sigma_0)-\ell(\Sigma)\geq\|\Sigma-\Sigma_0\|_{op}^2$

As a proof, from the definition of the model in ExPLoRe, $F_*(t)=(2-\epsilon)/(1+e^t)$ which implies that $F_*'(t)=-(2-\epsilon)e^t/(1+e^t)^2$. As X is bounded (Assumption B.2), $\langle XX^T,\Sigma\rangle\leq\lambda_{max}(\Sigma)\|X\|_2^2\leq C_+U^2$ for all $X\in X$, $\Sigma\in\Theta$, wherein the constants $C_+$ and U are as defined in Assumptions B.3 and B.2, respectively. Hence, there exists $\tilde{K}>0$ such that $|F_*'(X'(\alpha\Sigma+(1-\alpha)\Sigma_0)X)|\geq\tilde{K}$ for all $X,\Sigma$. $D=XX^T$ for notational simplicity. From the definition of $l(\Sigma)$:

$$l\left(\sum\right) = E\left(F_*\left(\langle D,\sum_0\rangle\right)\log F_*\left(\langle D,\sum\rangle\right)+\left(1-F_*\left(\langle D,\sum_0\rangle\right)\right)\left(1-\log F_*\left(\langle D,\sum\rangle\right)\right)\right) \quad (B.5)$$

$$= l\left(\sum_0\right)-E\left[KL\left(Bern\left(F_*\left(\langle D,\sum^0\rangle\right)\right)\|Bern(F_*(\langle D,\sum\rangle))\right)\right]$$

$$\leq l\left(\sum^0\right)-2E\left[\left(F_*\left(\langle D,\sum_0\rangle\right)-F_*\left(\langle D,\sum\rangle\right)\right)^2\right],$$

wherein the last inequality follows from Pinsker's inequality. Using Equation B.5 it can be concluded that:

$$l(\Sigma^0) - l(\Sigma) \geq 2E\left[\left(F_*(\langle D, \Sigma_0\rangle) - F_*(\langle D, \Sigma\rangle)\right)^2\right]$$

$$\geq 2\tilde{K}^2 E\left[\left(\langle D, \Sigma - \Sigma_0\rangle\right)^2\right]$$

$$\geq 2\tilde{K}^2 \|\Sigma - \Sigma_0\|_{op}^2 E\left[\left(\left\langle D, \frac{\Sigma - \Sigma_0}{\|\Sigma - \Sigma_0\|_{op}}\right\rangle\right)^2\right]$$

$$\geq 2\tilde{K}^2 \|\Sigma - \Sigma_0\|_{op}^2 E\left[\left(X^T \frac{\Sigma - \Sigma_0}{\|\Sigma - \Sigma_0\|_{op}} X\right)^2\right]$$

$$\geq 2c\tilde{K}^2 \|\Sigma - \Sigma_0\|_{op}^2$$

Here, the fact is used that $$\inf_{T \in S_d^{++} : \|T\|_{op}=1} E[(X^T T X)^2] = c > 0.$$

To prove the fact, it is assumed to the contrary that the infimum is 0. The set of all matrices T with $\|T\|_{op}=1$ is a compact subset of $\mathbb{R}^{d \times d}$. The following function is considered:

$$f: T \to E[(X^T T X)^2]$$

By discrete cosine transform (DCT), f is a continuous function. Hence, the infimum will be attained, which means that a matrix M can be found such that $M \in S_d^{++}$ and $\|M\|_{op}=1$ such that $E[(X^T M X)^2]=0$. Hence, $X^T M X=0$ almost surely. As the support of A contains an open set, it can be concluded that $M=0$ which contradicts $\|M\|_{op}=1$.

Next, we establish an upper bound on the variability of the centered function $g_\Sigma - g_{\Sigma_0}$ in terms of the distance function, which is stated in the following lemma: According to Lemma B.6., under the aforementioned assumptions, $$\text{Var}(g_\Sigma - g_{\Sigma_0}) < d^2(\Sigma, \Sigma_0),$$

wherein $d(\Sigma, \Sigma_0) = \|\Sigma - \Sigma_0\|_{op}$.

As a proof, the following observation is made $$g_{\Sigma_0}(X, Y) - g_\Sigma(X, Y) = Y \log \frac{F_*\left(X' \sum_0 X\right)}{F_*\left(X' \sum X\right)} + (1-Y) \log \frac{1 - F_*\left(X' \sum_0 X\right)}{1 - F_*\left(X' \sum X\right)}$$

From the assumption on the parameter space, it is known that there exists $p>0$ such that $p \leq F(X'\Sigma X) \leq 1-p$ for all $\Sigma \in \Theta$ and for all X almost surely. Hence, $$|g_{\Sigma_0}(X, Y) - g_\Sigma(X, Y)| \leq$$

$$\left|\log \frac{F_*\left(X' \sum_0 X\right)}{F_*\left(X' \sum X\right)}\right| + \left|\log \frac{1 - F_*\left(X' \sum_0 X\right)}{1 - F_*\left(X' \sum X\right)}\right| \leq 2K \left|F_*\left(X' \sum_0 X\right) - F_*\left(X' \sum X\right)\right| [K \text{ is the upper bound on the derivative of log}] \leq$$

$$K\left|X'\left(\sum - \sum_0\right)X\right| [\text{As } F'_* \leq 1/2] \leq KU \left\|\sum - \sum_0\right\|_{op}$$

Which concludes the lemma.

The following lemma establishes an upper bound on the modulus of continuity of the centered empirical process. According to Lemma B.7, under the aforementioned assumptions, for any $\delta > 0$:

$$E\left(\sup_{d(\Sigma, \Sigma_0) \leq \delta} |P_n(g_{\Sigma_0} - g_\Sigma) - P(g_{\Sigma_0} - g_\Sigma)|\right) \leq \delta$$

As a proof, $\delta > 0$ is fixed. Define $\mathcal{H}_\delta = \{h_\Sigma = g_\Sigma - g_{\Sigma_0} : \|\Sigma - \Sigma_0\|_{op} \leq \delta\}$. It is provided that $g_\Sigma - g_{\Sigma_0} = h_\Sigma^1 + h_\Sigma^2$, wherein $$h_\Sigma^{(1)} = Y \log \frac{F_*(X'\Sigma_0 X)}{F_*(X'\Sigma X)}, \quad h_\Sigma^{(2)} = (1-Y) \log \frac{1 - F_*(X'\Sigma_0 X)}{1 - F_*(X'\Sigma X)}$$

Hence, $H_\delta \subset H_6^{(1)} + H_6^{(2)}$ wherein $H_\delta^{(i)} = \{h_\Sigma^{(i)} : \|\Sigma - \Sigma_0\|_{op} \leq \delta\}$ for $i \in \{1, 2\}$. Next, it is proposed that $H_\delta^{(1)}$ has a finite Vapnik-Chervonenkis (VC) dimension. To see this, the function $(X, Y) \to \langle XX', \Sigma \rangle$ is considered. As this is a linear function, it has a finite VC dimension. Now the function $\log \circ F_*$ is monotone. As the composition of monotone functions keeps the VC dimension finite, it can be seen that $(X, Y) \to \log F_*(\langle XX', \Sigma\rangle)$ is also a VC class. It is also easy to see that the projection map $(X, Y) \to Y$ is a VC class, which implies the functions $(X, Y) \to Y \log F_*(\langle XX', \Sigma\rangle)$ form a VC class. As $\Sigma_0$ is fixed, it can be easily concluded that the class of functions $$(X, Y) \to Y \log \frac{F_*(X'\Sigma_0 X)}{F_*(X'\Sigma X)}$$

has a finite VC dimension. In a similar fashion, it can be established that $H_\delta^{(2)}$ also has a finite VC dimension. If $V_i$ is the VC dimension of $H_6^{(i)}$, and $h_\delta$ is defined as the envelope function of $H_\delta$, then, $$|h_\delta(X, Y)| = \left|\sup_{\|\Sigma - \Sigma_0\|_{op} \leq \delta} h_\Sigma(X, Y)\right|$$

$$\leq \sup_{\|\Sigma - \Sigma_0\|_{op} \leq \delta} |h_\Sigma(X, Y)|$$

$$\leq \sup_{\|\Sigma - \Sigma_0\|_{op} \leq \delta} [|\log F_*(X'\Sigma_0 X) - \log F_*(X'\Sigma X)| +$$

$$|\log(1 - F_*(X'\Sigma_0 X)) - \log(1 - F_*(X'\Sigma X))|]$$

$$\leq 2K_1 \sup_{\|\Sigma - \Sigma_0\|_{op} \leq \delta} |X'(\Sigma - \Sigma_0)X| \leq 2K_1 U \delta.$$

It is notable that $h_\delta$ can also serve as an envelope for both $H_\delta^{(1)}$ and $H_\delta^{(2)}$. Using the maximal inequality from classical empirical process theory (see, e.g., Theorem 2.14.1 in A. W. Van Der Vaart, "Weak Convergence" in Weak convergence and empirical processes, pp. 238-268. Springer, 1996) provides:

$$E\left(\sup_{d(\Sigma, \Sigma_0) \leq \delta} |P_n(g_{\Sigma_0} - g_\Sigma)|\right) \leq J(1, \mathcal{H}_\delta)\sqrt{Ph_\delta^2} \leq J(1, \mathcal{H}_\delta) 2K_1 U \delta \quad \text{(B.6)}$$

for all $\delta > 0$, wherein $$J(1, \mathcal{H}_\delta) = \sup_Q \int_0^1 \sqrt{1 + \log N(\epsilon \|h_\delta\|_{Q,2}, \mathcal{H}_\delta, L_2(Q))} \, d\epsilon$$

$$\leq \sup_Q \int_0^1 \sqrt{1 + \log N(\epsilon \|h_\delta\|_{Q,2}, \mathcal{H}_\delta^{(1)} + \mathcal{H}_\delta^{(2)}, L_2(Q))} \, d\epsilon$$

$$\leq \sup_Q \int_0^1 \sqrt{1 + \sum_{i=1}^2 \log N(\epsilon \|h_\delta\|_{Q,2}, \mathcal{H}_\delta^{(i)}, L_2(Q))} \, d\epsilon$$

$$\leq \sup_Q \int_0^1 \sqrt{1 + \sum_{i=1}^2 \left[ \log K + \log V_i + V_i \log 16e + 2(V_i - 1) \log \frac{1}{\epsilon} \right]} \, d\epsilon$$

which is finite, and completes the proof.

A result from Massart et al., "Risk Bounds for Statistical Learning," The Annals of Statistics, vol. 34, no. 5, 2326-2366 (October 2006) (hereinafter "Massart") provides the last ingredient of the proof which, when applied to the present setting, yields an exponential tail bound. For convenience, a tailor-made version of the result from Massart is provided below, which is then applied to the present problem.

According to a Theorem B.8 (Application of Talagarand's inequality), $\{Z_i=(X_i, Y_i)\}_{i=1}^n$ are i.i.d. observations taking values in the sample space $Z:X \times \mathcal{Y}$, and $\mathcal{F}$ is a class of real-valued functions defined on X. $\gamma$ is a bounded loss function on $\mathcal{F} \times Z$ and it is posited that $f^* \in \mathcal{F}$ uniquely minimizes the expected loss function $P(\gamma(f,.))$ over $\mathcal{F}$. The empirical risk is defined as $\gamma_n(f) = 1/n \Sigma_{i=1}^n \gamma(f, Z_i)$, and $\bar{\gamma}_n(f) = \gamma_n(f) - P(\gamma(f,.))$. $l(f^*, f) = P(\gamma(f,.)) - P(\gamma(f^*,.))$ is the excess risk. It is assumed that:

1. There is a pseudo-distance d on $\mathcal{F} \times \mathcal{F}$ satisfying $Var_P[\gamma(f,.) - \gamma(f^*,.)] \leq d^2(f, f^*)$.
2. There exists $F \subseteq \mathcal{F}$ and a countable subset $F' \subseteq \mathcal{F}$, such that for each $f \in F$, there is a sequence $\{f_k\}$ of elements of F' satisfying $\gamma(f_k, z) \to \gamma(f, z)$ as $k \to \infty$, for every $z \in Z$.
3. $l(f, f^*) \geq d^2(f^*, f) \forall f \in \mathcal{F}$.
4. $\sqrt{n} \mathbb{E}[\sup_{f \in F': d(f, f^*) \leq \sigma} [\bar{\gamma}_n(f) - \bar{\gamma}_n(f^*)]] \leq \phi(\sigma)$ for every $\sigma > 0$ such that $\phi(\sigma) \leq \sqrt{n} \sigma$. $\epsilon_*$ is such that $\sqrt{n} \epsilon_*^2 \geq \phi(\epsilon_*)$. $\hat{f}$ is the (empirical) minimizer of $\gamma_n$ over F, and $l(f^*, F) + \inf_{f \in F} l(f^*, f)$. Then, there exists an absolute constant K such that for all $y \geq 1$, the following inequality holds:

$$P(l(f^*, \hat{f}) > 2l(f^*, F) + Ky\epsilon_*^2) \leq e^{-y}.$$

The collection of function is $\mathcal{G} = \{g_\Sigma : \|\Sigma - \Sigma_0\|_{op}\}$ The corresponding pseudo-distance is $d(g_\Sigma, g_{\Sigma_0}) = \|\Sigma - \Sigma_0\|_{op}$. Condition 2 is easily satisfied as the parameter space has countable dense set and the loss function is continuous with respect to the parameter. Conditions 1 and 3 follows from Lemma B.6 and Lemma B.5, respectively. Condition 4 is satisfied via Lemma B.7 with $\phi(\sigma) = \sigma$. Hence, one can take $\epsilon_n = \sqrt{n}$ and conclude that there exists a constant K such that, for all $t \geq 1$, $$P(n(l(\Sigma_0) - l(\hat{\Sigma})) \geq Kt) \leq e^{-t}$$

From Lemma B.5, $\|\hat{\Sigma} - \Sigma_0\|_{op}^2 \leq l(\Sigma_0) - l(\hat{E})$ which implies that $$P(\sqrt{n} \|\hat{\Sigma} - \Sigma_0\|_{op}^2 K_1 t) \leq e^{-t^2}$$

which completes the proof of the theorem.

Further, Theorem B.4 can be combined with Proposition 3.1 and Proposition 3.2 of Yurochkin to show that EXPLoRe in conjunction with SENSR trains individually fair machine learning models. For simplicity, the same notations are used as in Yurochkin. $\mathcal{L} = \{\ell(\cdot, \theta) : \theta \in \Theta\}$ is defined as the loss class. It is assumed that:

1. The embedded feature space of $\omega$ is bounded $R \triangleq \max\{\text{diam}(\varphi), \text{diam}_*(\varphi)\} < \infty$, wherein $\text{diam}_*$ is the diameter of in the (unknown) exact fair metric $$d_x^*(x_1, x_2) = \langle (\varphi_1 - \varphi_2), \Sigma_0 (\varphi_1 - \varphi_2) \rangle^{1/2},$$

and diam is the diameter in the learned fair metric $$\hat{d}_x(x_1, x_2) = \langle (\varphi_1 - \varphi_2), \hat{\Sigma} (\varphi_1 - \varphi_2) \rangle^{1/2}.$$

2. The loss functions in $\mathcal{L}$ is uniformly bounded, i.e., $0 \leq \ell(z, \theta) \leq M$ for all $z \in Z$ and $\theta \in \Theta$ where $z = (x, y)$.
3. The loss functions in $\mathcal{L}$ is L-Lipschitz with respect to $d_x$, i.e., $$\sup_{\theta \in \Theta} \{\sup_{(x_1, y), (x_2, y) \in Z} |\ell((x_1, y), \theta) - \ell((x_2, y), \theta)|\} \leq L d_x(x_1, x_2).$$

$\delta^*$ is defined to be the bias term:

$$\min_{\theta \in \Theta} \sup_{P: W_*(P, P_*) \leq \epsilon} [\mathbb{E}_P(\ell(Z, \theta))] = \delta^*,$$

wherein $W^*$ is the Wasserstein distance with respect to the true matrix $\Sigma_0$ and W is Wasserstein distance with respect to $\hat{\Sigma}$.

Now for $x_1, x_2 \in X$:

$$|\hat{d}_x^2(x_1, x_2) - (d_x^*(x_1, x_2))^2| = |(\varphi_1 - \varphi_2)^\top (\hat{\Sigma} - \Sigma^*)(\varphi_1 - \varphi_2)|$$

$$\leq \|\hat{\Sigma} - \Sigma^*\|_{op} \|\varphi_1 - \varphi_2\|_2^2$$

$$\leq R^2 \|\hat{\Sigma} - \Sigma^*\|_{op}$$

$$\leq R^2 K_1 \frac{t}{\sqrt{n}},$$

wherein the last inequality is valid with a probability greater than or equal to $1 - e^{-bt^2}$ from Theorem B.4. Hence, with high probability:

$$\sup_{x_1, x_2 \in X} |\hat{d}_x^2(x_1, x_2) - (d_x^*(x_1, x_2))^2| \leq R^2 K_1 \frac{t}{\sqrt{n}}.$$

Thus, $\delta_c = K_1 t / \sqrt{n}$ in Proposition 3.2 of Yurochkin can be used to conclude the following.

According to a Corollary B.9, assuming the loss function $\ell \in \mathcal{L}$ and defining the estimator $\hat{\theta}$ as:

$$\hat{\theta} \in \arg\min_{\theta \in \Theta} \sup_{P: W(P,P_n) \le \epsilon} E_P[\ell(Z,h)]$$

then the estimator $\hat{\theta}$ satisfies with probability greater than or equal to $1-t-e^{-t^2}$:

$$\sup_{P: W_*(P,P_*) \le \epsilon} E_P[\ell(Z,\hat{\theta})] - E_{P_*}[\ell(Z,\hat{\theta})] \le \delta^* + 2\delta_n, \quad (B.7)$$

wherein W and $W_*$ are the learned and exact fair Wasserstein distances induced by the learned and exact fair metrics (see Section 2.1 in Yurochkin) and $$\delta_n \le \frac{48\mathfrak{C}(\mathcal{L})}{\sqrt{n}} + \frac{48LR^2}{\sqrt{n\epsilon}} + \frac{LK_1 tR^2}{\sqrt{n\epsilon}} + M\left(\frac{\log\frac{2}{t}}{2n}\right)^{\frac{1}{2}},$$

wherein $\mathfrak{C}(\mathcal{L}) = \int_0^\infty \sqrt{\log(\mathcal{N}_\infty(\mathcal{L},r))} dr$, with $\mathcal{N}_\infty(\mathcal{L},r)$ being the covering number of the loss class $\mathcal{L}$ with respect to the uniform metric.

A proof of Theorem 3.1 is now provided. One key ingredient for the proof is a version of Davis-Kahan's sin $\Theta$ theorem found in Davis and Kahan, "The Rotation of Eigenvectors by a Perturbation. III." SIAM Journal on Numerical Analysis, vol. 7, no. 1, pp. 1-46, March 1970 (hereinafter "Davis and Kahan"), which is stated here for convenience:

According to a Theorem C.1, suppose that A, $E \in \mathbb{R}^{d \times d}$, wherein $\hat{A} = A + E$. Further, suppose U (respectively $\hat{U}$) denotes the top-k eigenvectors of A (respectively $\hat{A}$). Define $\gamma = \lambda_k(A) - \lambda_{(k+1)}(A)$ Then, if $\|E\|_{op} < \gamma$:

$$\|\hat{U}\hat{U}^T - UU^T\|_{op} \le \frac{\|E\|_{op}}{\gamma - \|E\|_{op}}$$

In the present context, $U_k$ and $\hat{U}_k$ denote the eigenspace corresponding to top-k eigenvectors of $\Sigma$ and $S_n$, respectively. $\lambda_1 \ge \lambda_2 \ge \ldots \ge \lambda_d$ are the eigenvalues of $\Sigma$, and $\hat{\lambda}_1 \ge \hat{\lambda}_2 \ge \ldots \ge \hat{\lambda}_d$ are eigenvalues of $S_n$. Applying the above theorem, the following bound is obtained:

$$\|U_k U_k^* - \hat{U}_k \hat{U}_k^*\|_{op} \le \frac{\|\Sigma - S_n\|_{op}}{\eta - \|\Sigma - S_n\|_{op}}, \quad (C.1)$$

wherein $\eta = \lambda_k(\Sigma) - \lambda_{k+1}(\Sigma)$. To provide a high probability bound on $\|S_n - \Sigma\|_{op}$, Remark 5.40 of R. Vershynin, "Introduction to the non-asymptotic analysis of random matrices," arXiv:1011.3027v7 (November 2011) (61 pages) (hereinafter "Vershynin") is used, which implies that with probability $\ge 1 - 2e^{-ct^2}$:

$$\|\Sigma - S_n\|_{op} \le \delta \vee \delta^2 \quad (C.2)$$

wherein $$\delta = \frac{C\sqrt{d}+t}{\sqrt{n}}.$$

For $t < (\sqrt{n\gamma} - C\sqrt{d}) \wedge (\sqrt{n\gamma} - C\sqrt{d})$, $\eta > \delta \vee \delta^2$. Hence, combining the bounds from equation C.1 and equation C.2:

$$\|U_k U_k^* - \hat{U}_k \hat{U}_k^*\|_{op} \le \frac{\delta \vee \delta^2}{\eta - (\delta \vee \delta^2)}. \quad (C.3)$$

Here the constant C,c depends only on $\|x_i\|_{\psi_2}$. To conclude the proof, a bound on the bias term $\|U_k U_k^T - \tilde{A}_* \tilde{A}_*^T\|_{op}$ is needed, which is obtained from another application of Theorem C.1. From the representation of $\Sigma$:

$$\Sigma = A_* A_*^T + B_* B_*^T + \sigma^2 I_d = \tilde{A}_* \Lambda \tilde{A}_*^T + B_* B_*^T + \sigma^2 I_d,$$

wherein $\tilde{A}_*$ is the set of eigenvectors of $A_*$, and $\Lambda$ is the diagonal matrix of the eigenvalues. Theorem C.1 can be applied on $\Sigma$ taking $A = \tilde{A}_* \Lambda \tilde{A}_*^T, E = B_* B_*^T + \sigma^2 I_d$ and $\Sigma = \hat{A}$. Here, $\lambda_k(A) = \lambda_{min}(A_* A_*^T)$ and $\lambda_{k+1}(A) = 0$. Hence, $\gamma = \lambda_{min}(A_* A_*^T)$. As by the assumption $\|B_* B_*^T + \sigma^2 I_d\|_{op} < \gamma = \lambda_{min}(A_* A_*^T)$, the following can be obtained:

$$\|U_k U_k^T - \tilde{A}_* \tilde{A}_*^T\|_{op} \le \frac{\|B_* B_*^T + \sigma^2 I_d\|_{op}}{\lambda_{min}(A_* A_*^T) - \|B_* B_*^T + \sigma^2 I_d\|_{op}} = b.$$

To conclude the theorem, a bound is provided on $\eta = \lambda_k(\Sigma) - \lambda_{k+1}(\Sigma)$ To upper bound $\lambda_{k+1}(\Sigma)$ the Courant-Fisher theorem is used:

$$\lambda_{k+1}(\Sigma) + \inf_{S \subseteq \mathbb{R}^d : dim(S) = d-k} \sup_{x \in S^{d-1} \cap S} x^T \Sigma x \le \sup_{x \in S^{d-1} \cap \tilde{A}_*^\perp} x^T \Sigma x$$

$$= \sup_{x \in S^{d-1} \cap \tilde{A}_*^\perp} x^T B_* B_*^T x + \sigma^2 \le \|B_* B_*^T\|_{op} + \sigma^2.$$

The lower bound on $\lambda_k(\Sigma)$ can be obtained easily as follows: for any $x \in S^{d-1}$:

$$x^T \Sigma x = x^T A_* A_*^T x + x^T B_* B_*^T x + \sigma^2 \ge \lambda_{min}(A_* A_*^T) + \sigma^2.$$

This automatically implies $\lambda_k(\Sigma) \ge \lambda_{min}(A_* A_*^T) + \sigma^2$. Hence, combining the bound on $\lambda_k(\Sigma)$ and $\lambda_{k+1}(\Sigma)$ provides:

$$\eta = \lambda_k(\Sigma) - \lambda_{k+1}(\Sigma) \ge \lambda_{min}(A_* A_*^T) - \|B^* B^*{}^T\|_{op} = \tilde{\gamma} \quad (C.5)$$

Combining Equations C.2, C.4 and C.5 and using the fact that:

$$\|\hat{U}\hat{U}^T - \tilde{A}_* \tilde{A}_*^T\|_{op} = \|\hat{\Sigma} - \Sigma_0\|_{op}$$

the theorem is concluded.

A proof of Theorem 3.2 is now provided. The variance covariance matrix of $\varphi_i$ can be represented as:

$$\Sigma_\varphi = A_* A_*^T + B_* B_*^T + \sigma^2 I_d.$$

As in the proof of the previous theorem, $\lambda_1 \ge \ldots \ge \lambda_d$ is defined as the eigenvalues of $\Sigma_\varphi$ and $\hat{\lambda}_1 \ge \ldots \ge \hat{\lambda}_d$ is defined as the eigenvalues of $S_n$. Also, $U_k$ (respectively $\hat{U}_k$) is defined as the matrix containing top-k eigenvectors of $\Sigma$, $\hat{U}_k$ is defined as the matrix containing top-k eigenvectors of $S_n$, and $\eta = \lambda_k - \lambda_{k+1}$. Using Davis-Kahan's sin $\Theta$ theorem (see Theorem C.1 above), it is concluded that:

$$\|\hat{U}_k \hat{U}_k^T - U_k U_k^T\|_{op} \le \frac{\|S_n \Sigma_\varphi\|_{op}}{\gamma - \|S_n - \Sigma_\varphi\|_{op}} \quad (C.6)$$

provided that $\eta > \|S_n - \Sigma_\varphi\|_{op}$. Using matrix concentration inequality (see remark 5.40 of Vershynin) it is provided with probability $> 1 - 2e^{-ct^2}$ that:

$$\|S_n - \Sigma\|_{op} \leq \delta \vee \delta^2 + \frac{t}{n}, \quad (C.7)$$

wherein $\delta=(C\sqrt{d}+t)/\sqrt{n}$, for all $t \geq 0$. The difference between this and Equation C.2 in Theorem 3.1 is the extra term $t/n$, which appears due to the mean centering of the samples. The constants c,C only depends on the $\psi_2$ norm of $\varphi_i$. Combining equation C.6 and C.7, it is concluded, with high probability, that:

$$\left\|\hat{U}_k \hat{U}_k^T - U_k U_k^T\right\|_{op} \leq \frac{\delta \vee \delta^2 + t/n}{\eta - (\delta \vee \delta^2) - t/n}$$

when $t/n + \delta \vee \delta^2 < \eta$. As before, Theorem C.1 is applied to control the bias. To that end, $A = A_* A_*^T = \tilde{A}_* \Lambda \tilde{A}_*^T$ is defined, wherein $\tilde{A}_*$ is the matrix of eigenvectors of $A_*$, and $\Lambda$ is diagonal matrix with the eigenvalues of $A_* A_*^T$. Also, $E = B_* B_*^T + \sigma^2 I_d$ is defined and $\hat{A} = \Sigma_\varphi$. As before, $\lambda_k(A) = \lambda_{min}(A_* A_*^T)$ and $\lambda_{k+1}(A) = 0$. Hence $\gamma = \lambda_k(A) - \lambda_{k+1}(A) = \lambda_{min}(A_* A_*^T)$. Applying Theorem C.1, it is concluded that:

$$\left\|U_k U_k^T - \tilde{A}_* \tilde{A}_*^T\right\|_{op} \leq \frac{\|B_* B_*^T + \sigma^2 I_d\|_{op}}{\lambda_{min}(A_* A_*^T) - \|B_* B_*^T + \sigma^2 I_d\|_{op}}. \quad (C.8)$$

Finally, the Courant-Fischer Min-max theorem is used to provide an upper bound on $\eta = \lambda_k(\Sigma_\varphi) - \lambda_{k+1}(\Sigma_\varphi)$. As in the previous proof:

$$\lambda_{k+1}(\Sigma_\varphi) = \inf_{S \subseteq \mathbb{R}^d : dim(S) = k+1} \sup_{x \in S^{d-1} \cap S} x^T \Sigma_\varphi x \leq \sup_{x \in S^{d-1} \cap \tilde{A}_*^\perp} x^T \Sigma_\varphi x$$

$$= \sup_{x \in S^{d-1} \cap \tilde{A}_*^\perp} x^T B_* B_*^T x + \sigma^2 \leq \|B_* B_*^T\|_{op} + \sigma^2$$

$$\lambda_{k+1}(\Sigma_\varphi) = \sup_{S \subseteq \mathbb{R}^d : dim(S) = d-k} \sup_{x \in S^{d-1} \cap S} x^T \Sigma_\varphi x \leq \sup_{x \in S^{d-1} \cap \tilde{A}_*^\perp} x^T \Sigma_\varphi x$$

$$= \sup_{x \in S^{d-1} \cap \tilde{A}_*^\perp} x^T B_* B_*^T x + \sigma^2 \leq \|B_* B_*^T\|_{op} + \sigma^2.$$

To get a lower bound on $\lambda_k(\Sigma_\varphi)$, the other version of Courant-Fischer Minmax theorem is used:

$$\lambda_k(\Sigma_\varphi) = \max_{S : dim(S) = d-k+1} \min_{x \in S^{d-1} \cap S} x^T \Sigma x$$

Using this it is concluded that:

$$\lambda_k(\Sigma_\varphi) \geq \lambda_{min}(A_* A_*^T) + \sigma^2$$

Hence, combining the bound on $\lambda_k(\Sigma_\varphi)$ and $\lambda_{k+1}(\Sigma_\varphi)$ provides:

$$\eta = \lambda_k(\Sigma_\varphi) - \lambda_{k+1}(\Sigma_\varphi) \geq \lambda_{min}(A_* A_*^T) - \|B_* B_*^T\|_{op} = \tilde{\gamma}. \quad (C.9)$$

Combining Equations C.7, C.8 and C.9, and using the fact that:

$$\|\hat{U}\hat{U}^T - \tilde{A}_* \tilde{A}_*^T\|_{op} = \|\hat{\Sigma} - \Sigma_0\|_{op}$$

The theorem is concluded.

A proof of Theorem 3.3 is now provided. The proof of Theorem 3.3 essentially follows form Proposition 3.2 and Proposition 3.1 of Yurochkin. It is notable that, from Theorem 3.1, for any $x_1, x_2 \in X$:

$$|\hat{d}_x^2(x_1, x_2) - (d_x^*(x_1, x_2))^2| = |(\varphi_1, \varphi_2)^\top (\hat{\Sigma} - \Sigma^*)(\varphi_1, \varphi_2)|$$

$$\leq \|\hat{\Sigma} - \Sigma^*\|_{op} \|\varphi_1 - \varphi_2\|_2^2$$

$$\leq R^2 \|\hat{\Sigma} - \Sigma^*\|_{op}$$

$$\leq R^2 \left[b + \frac{\delta \vee \delta^2}{\tilde{\gamma} - (\delta \vee \delta^2)}\right],$$

wherein the last inequality is true with probability greater than or equal to $1 - 2e^{-ct^2}$ from Theorem 3.1. This justifies taking $$\delta_c \geq \left[b + \frac{\delta \vee \delta^2}{\tilde{\gamma} - (\delta \vee \delta^2)}\right]$$

which, along with Proposition 3.1 and 3.2 of Yurochkin, completes the proof.

As will be described below, one or more elements of the present techniques can optionally be provided as a service in a cloud environment. For instance, one or more steps of methodology 100 of FIG. 1, one or more steps of methodology 300 of FIG. 3, one or more steps of methodology 400 of FIG. 4 and/or one or more steps of methodology 500 of FIG. 5 can be performed on a dedicated cloud server to take advantage of high-powered CPUs and GPUs, after which the result is sent back to a local device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
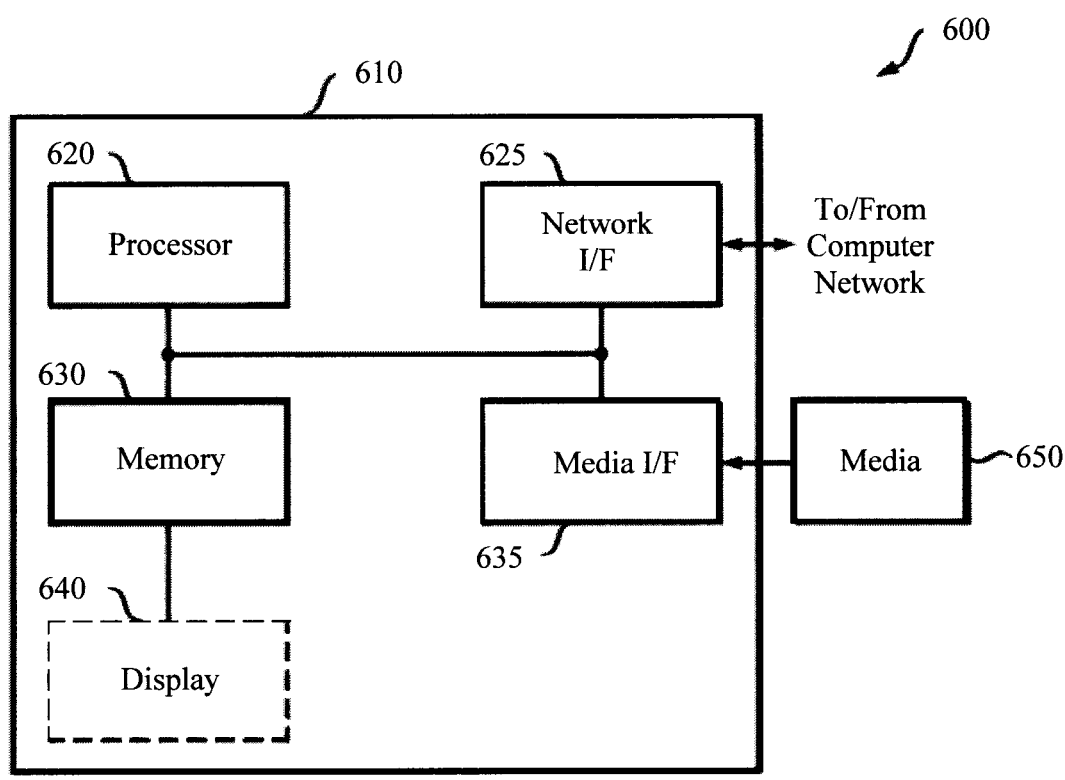
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more steps of methodology 100 of FIG. 1, one or more steps of methodology 300 of FIG. 3, one or more steps of methodology 400 of FIG. 4 and/or one or more steps of methodology 500 of FIG. 5.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Figure 7:
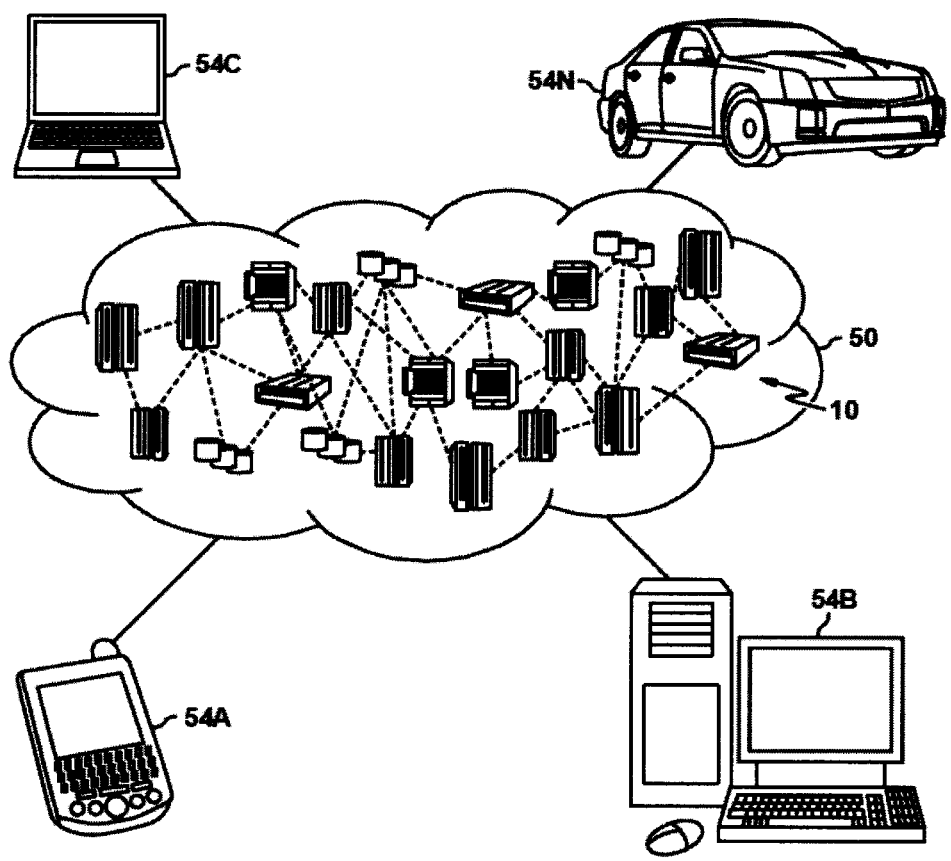
FIG. 7 depicts a cloud computing environment according to an embodiment of the present invention.
Figure 8:
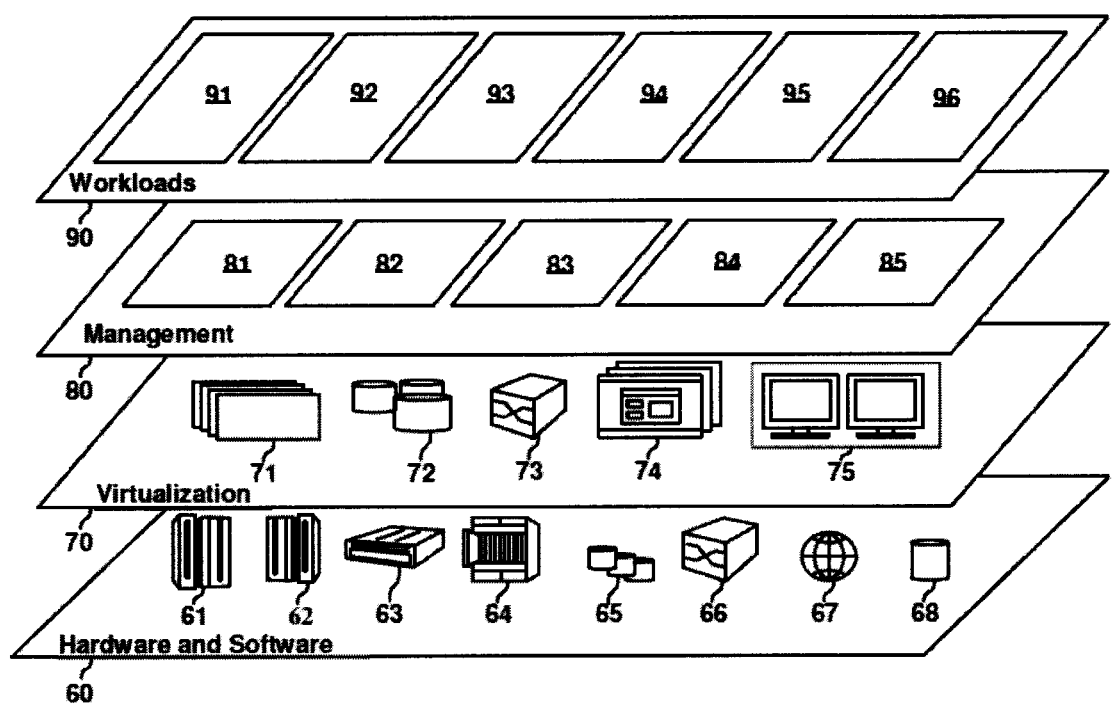
FIG. 8 depicts abstraction model layers according to an embodiment of the present invention.

Referring to FIG. 7 and FIG. 8, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and learning a fair Mahalanobis distance similarity metric from data 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for improving algorithmic fairness of machine learning models using learned fair Mahalanobis distance similarity metrics, the method comprising:
   obtaining training data comprising similarity annotations;
   determining one model out of a plurality of models to use in learning a Mahalanobis covariance matrix $\Sigma$ based on the obtained training data;
   learning the Mahalanobis covariance matrix $\Sigma$ from the obtained training data using the determined one model, wherein the Mahalanobis covariance matrix $\Sigma$ represents a fair Mahalanobis distance similarity metric; and
   training one or more machine learning models using, at least in part, the fair Mahalanobis distance similarity metric, for one or more machine learning model tasks.

2. The method of claim 1, wherein the fair Mahalanobis distance similarity metric is of a form:

$$d_x(x_1,x_2) @ \langle \varphi(x_1)-\varphi(x_2) \Sigma \varphi(x_1)-\varphi(x_2) \rangle,$$

wherein $\varphi(x):X \to R^d$ is an embedding map and $\Sigma \in S_+^d$.

3. The method of claim 1, wherein the obtained training data comprises groups of comparable samples.

4. The method of claim 3, wherein the determined one model comprises a factor model.

5. The method of claim 4, wherein the factor model comprises:

$$\varphi_i = A_* u_i + B_* v_i + \delta_i,$$

wherein $\varphi_i \in R^d$ is a learned representation of $x_i$, $u_i \in R^K$ is a sensitive attribute of $x_i$ for a task at hand, $v_i \in R^L$ is a relevant attribute of $x_i$ for the task at hand, and $\delta_i$ is an error term.

6. The method of claim 5, further comprising:
   choosing an orthogonal complement of ran($A_*$) for the Mahalanobis covariance matrix $\Sigma$, wherein ran ($A_*$) is a column space of $A_*$; and
   solving for ran ($A_*$).

7. The method of claim 1, wherein the obtained training data comprises pairs of samples that are comparable, incomparable, or combinations thereof.

8. The method of claim 7, wherein the determined one model comprises a binary response model.

9. The method of claim 8, wherein the data comprises human user feedback in a form of triplets $\{(x_{i1}, x_{i2}, y_i)\}_{i=1}^n$, where $y_i \in \{0,1\}$ indicates whether a human user considers $x_{i1}$ and $x_{i2}$ comparable, wherein $(x_{i1}, x_{i2}, y_i)$ satisfies the binary response model:

$$y_i|x_{i1}, x_{i2}: Ber(2\sigma(-d_i)), (d_i @ \|\varphi_{i1} - \varphi_{i2}\|_{\Sigma_0}^2 =$$

$$(\varphi_{i1} - \varphi_{i2})^T \sum_0 (\varphi_{i1} - \varphi_{i2}) = \left\langle \frac{(\varphi_{i1} - \varphi_{i2})(\varphi_{i1} - \varphi_{i2})^T}{144424443}, \sum_0 \right\rangle,$$
$$D_i$$

and wherein $$\sigma(z) @ \frac{1}{1+e^{-z}}$$

is a logistic function, $\varphi_{i1}$ and $\varphi_{i2}$ are learned representations of $x_{i1}$ and $x_{i2}$, respectively, and $\Sigma_0 \in S_+^d$.

10. The method of claim 9, further comprising:
    estimating $\Sigma_0$ as a maximum of a log-likelihood function:

$$+\log(1-2\sigma(-\langle D_i, \Sigma \rangle))$$

$$+\log(1 - 2\sigma(-\langle D_i, \Sigma \rangle))$$

$$\ell_n(\Sigma) = \frac{1}{n}\sum_{i=1}^n y_i \log \frac{2\sigma(-\langle D_i, \Sigma \rangle)}{1 - 2\sigma(-\langle D_i, \Sigma \rangle)};$$

and
maximizing $1_n$ using stochastic gradient descent (SGD).

11. The method of claim 1, wherein the training data is obtained from at least one data source selected from the group consisting of: human user feedback, hand-picked groups of similar training examples, hand-crafted examples that should be treated similarly as observed training examples, and combinations thereof.

12. The method of claim 1, further comprising:
    restructuring the obtained training data by using embeddings of the data.

13. The method of claim 1, wherein the one or more machine learning model tasks comprises one or more classification tasks and/or one or more natural language processing tasks.

14. A method for improving algorithmic fairness of machine learning models using learned fair Mahalanobis distance similarity metrics, the method comprising:
    obtaining training data of one of two types: training data of a first type wherein the data comprises groups of comparable samples or training data of a second type wherein the data comprises pairs of samples that are comparable, incomparable, or combinations thereof;

determining to use a factor model if the training data of the first type is obtained, or to use a binary response model if the training data of the second type is obtained, in learning a Mahalanobis covariance matrix $\Sigma$;

learning the Mahalanobis covariance matrix $\Sigma$ from the obtained training data using the determined factor model or the determined binary response model, wherein the Mahalanobis covariance matrix $\Sigma$ represents a fair Mahalanobis distance similarity metric; and training one or more machine learning models using, at least in part, the fair Mahalanobis distance similarity metric, for one or more machine learning model tasks.

15. The method of claim 14, wherein the fair Mahalanobis distance similarity metric is of a form:

$$d_x(x_1,x_2) @ \langle \varphi(x_1)-\varphi(x_2)\Sigma(\varphi(x_1)-\varphi(x_2))\rangle,$$

wherein $\varphi(x): X \to R^d$ is an embedding map and $\Sigma \in S_+^d$.

16. The method of claim 14, wherein the determined one model is a factor model, and wherein the factor model comprises:

$$\varphi_i = A_* u_i + B_* \upsilon_i + \delta_i,$$

wherein $\varphi_i \in R^d$ is a learned representation of $x_i$, $u_i \in R^K$ is a sensitive attribute of $x_i$ for a task at hand, $\upsilon_i \in R^L$ is a relevant attribute of $x_i$ for the task at hand, and $\delta_i$ is an error term.

17. The method of claim 14, wherein the determined one model is a binary response model, wherein the data comprises human user feedback in a form of triplets $\{x_{i1}, x_{i2}, y_i\}_{i=1}^n$, where $y_i \in \{0,1\}$ indicates whether a human user considers $x_{i1}$ and $x_{i2}$ comparable, wherein $(x_{i1}, x_{i2}, y_i)$ satisfies the binary response model:

$$y_i|x_{i1}, x_{i2} : Ber(2\sigma(-d_i)), (d_i @ \|\varphi_{i1} - \varphi_{i2}\|)_{\Sigma_0}^2 =$$

$$(\varphi_{i1} - \varphi_{i2})^T \sum\nolimits_0 (\varphi_{i1} - \varphi_{i2}) = \left\langle \begin{matrix} (\varphi_{i1} - \varphi_{i2})(\varphi_{i1} - \varphi_{i2})^T, \sum\nolimits_0 \\ 144424443 \\ D_i \end{matrix} \right\rangle,$$

and wherein $$\sigma(z) @ \frac{1}{1+e^{-z}}$$

is a logistic function, $\varphi_{i1}$ and $\varphi_{i2}$ are learned representations of $x_{i1}$ and $x_{i2}$, respectively, and $\Sigma_0 \in S_+^d$.

18. The method of claim 14, wherein the training data is obtained from at least one data source selected from the group consisting of: human user feedback, hand-picked groups of similar training examples, hand-crafted examples that should be treated similarly as observed training examples, and combinations thereof.

19. A non-transitory computer program product for improving algorithmic fairness of machine learning models using learned fair Mahalanobis distance similarity metrics, the computer program product comprising a computer readable storage medium having program instructions embodied therewith, the program instructions executable by a computer to cause the computer to:

obtain training data comprising similarity annotations;

determine one model out of a plurality of models to use in learning a Mahalanobis covariance matrix $\Sigma$ based on the obtained training data;

learn the Mahalanobis covariance matrix $\Sigma$ from the obtained training data using the determined one model, wherein the Mahalanobis covariance matrix $\Sigma$ represents a fair Mahalanobis distance similarity metric; and train one or more machine learning models using, at least in part, the fair Mahalanobis distance similarity metric, for one or more machine learning model tasks.

20. The non-transitory computer program product of claim 19, wherein the fair Mahalanobis distance similarity metric is of a form:

$$d_x(x_1,x_2) @ \langle \varphi(x_1)-\varphi(x_2)\Sigma(\varphi(x_1)-\varphi(x_2))\rangle,$$

wherein $\varphi(x): X \to R^d$ is an embedding map and $\Sigma \in S_+^d$.

* * * * *